United States Patent
Kageyama et al.

(10) Patent No.: US 10,006,802 B2
(45) Date of Patent: Jun. 26, 2018

(54) DISPERSING FEED DEVICE AND COMBINATION WEIGHING DEVICE COMPRISED OF AT LEAST TWO ELASTIC UNITS INCLINED IN DIFFERENT DIRECTIONS WITH DIFFERENT NATURAL FREQUENCIES THAT CAN VARY A FEED DIRECTION OF ARTICLES THEREON BY CHANGING THE DRIVEN VIBRATION FREQUENCY

(71) Applicant: ISHIDA CO., LTD., Kyoto (JP)

(72) Inventors: Toshiharu Kageyama, Kyotanabe (JP); Yuji Okamoto, Ritto (JP)

(73) Assignee: ISHIDA CO., LTD., Kyoto (JP)

(*) Notice: Subject to any disclaimer, the term of this patent is extended or adjusted under 35 U.S.C. 154(b) by 158 days.

(21) Appl. No.: 15/126,645

(22) PCT Filed: Feb. 17, 2015

(86) PCT No.: PCT/JP2015/054330
§ 371 (c)(1),
(2) Date: Sep. 16, 2016

(87) PCT Pub. No.: WO2015/141358
PCT Pub. Date: Sep. 24, 2015

(65) Prior Publication Data
US 2017/0082481 A1    Mar. 23, 2017

(30) Foreign Application Priority Data
Mar. 18, 2014 (JP) ................. 2014-054521

(51) Int. Cl.
*B65G 27/32* (2006.01)
*G01G 19/393* (2006.01)
(Continued)

(52) U.S. Cl.
CPC .......... *G01G 19/393* (2013.01); *B65G 27/04* (2013.01); *B65G 27/08* (2013.01); *B65G 27/32* (2013.01)

(58) Field of Classification Search
CPC ...... G01G 19/393; B65G 27/04; B65G 27/08; B65G 27/32
See application file for complete search history.

(56) References Cited

U.S. PATENT DOCUMENTS 3,915,292 A * 10/1975 Brown ............... B65G 27/08
198/763
3,964,600 A * 6/1976 Vensel ............... B65G 27/32
198/761
(Continued)

FOREIGN PATENT DOCUMENTS

JP    H05-256682 A    10/1993
JP    H06-074814 A    3/1994
(Continued)

OTHER PUBLICATIONS

Computer translation of JP 2007-145544, from the JPO website, Apr. 12, 2018.*
(Continued)

*Primary Examiner* — Randy Gibson
(74) *Attorney, Agent, or Firm* — Studebaker & Brackett PC

(57) ABSTRACT

The present invention provides a dispersing feed device including: a dispersion table adapted to receive articles supplied from above and to feed the articles to multiple sections on the periphery of the dispersion table; a first elastic unit inclinedly connected to the dispersion table, the first elastic unit having a first natural frequency; a second elastic unit connected to the dispersion table inclinedly in a direction different from the inclination direction of the first elastic unit, the second elastic unit having a second natural (Continued)

frequency which is different from the first natural frequency; and at least one vibrating source adapted to vibrate the dispersion table through the first and second elastic units.

10 Claims, 15 Drawing Sheets

(51) Int. Cl.
   *B65G 27/04* (2006.01)
   *B65G 27/08* (2006.01)

(56) References Cited

U.S. PATENT DOCUMENTS

| | | | | | |
|---|---|---|---|---|---|
| 4,490,654 | A | * | 12/1984 | Buchas | B06B 1/0253 318/130 |
| 4,708,215 | A | * | 11/1987 | Nakamura | G01G 13/026 177/109 |
| 4,813,532 | A | * | 3/1989 | Harper | B65G 27/32 198/760 |
| 4,909,379 | A | * | 3/1990 | Albeck | B65G 27/08 198/757 |
| 5,172,512 | A | * | 12/1992 | Bodker | A01M 23/30 43/81 |
| 5,409,101 | A | * | 4/1995 | Ahmed | B65G 27/32 198/750.1 |
| 5,472,079 | A | * | 12/1995 | Yagi | B65G 27/32 198/756 |
| 5,756,939 | A | | 5/1998 | Taniguchi | |

FOREIGN PATENT DOCUMENTS

| | | |
|---|---|---|
| JP | 2003-327326 A | 11/2003 |
| JP | 2007-145544 A | 6/2007 |
| WO | 2009/078273 A1 | 6/2009 |

OTHER PUBLICATIONS

International Search Report issued in PCT/JP2015/054330; dated May 12, 2015.
Notification of Transmittal of Translation of the International Preliminary Report on Patentability (Chapter I) and Translation of Written Opinion of the International Searching Authority; PCT/JP2015/054330 dated Sep. 29, 2016.

* cited by examiner

DISPERSING FEED DEVICE AND COMBINATION WEIGHING DEVICE COMPRISED OF AT LEAST TWO ELASTIC UNITS INCLINED IN DIFFERENT DIRECTIONS WITH DIFFERENT NATURAL FREQUENCIES THAT CAN VARY A FEED DIRECTION OF ARTICLES THEREON BY CHANGING THE DRIVEN VIBRATION FREQUENCY

TECHNICAL FIELD

The present invention relates to a dispersing feed device which disperses articles to feed it to multiple sections on the periphery of the dispersing feed device, and the present invention relates to a combination weighing device having the dispersing feed device.

BACKGROUND ART

Patent Literature 1, JP H06-074814 A, discloses a combination weighing device as an example. The combination weighing device includes a dispersion feed unit which has a conical dispersion table, multiple radial feeders each of which has a trough extending radially from a periphery of the dispersion table, multiple pool hoppers each of which is arranged below a distal end of the trough, multiple weighing hoppers each of which is arranged below the pool hopper, and a merging chute which is arranged below the weighing hoppers. The articles supplied from above to the dispersion table are dispersed in a circumferential direction of the table to be fed toward its outside in a radial direction, causing the articles to fall off the table to be provided into the troughs of the radial feeders. In each trough, the articles are fed toward the outside of the trough in a radial direction by the radial feeder, causing the articles to fall off the trough to be provided into the weighing hopper through the pool hopper. The articles placed in the weighing hoppers are weighed. A computer combines the weighing values of the articles in the weighing hoppers to work out multiple combinations of the weighing values which are also called "combination weighing values". Then, the computer selects one combination from all of the combinations, which is closest to a preset weight. The articles fall off multiple weighing hoppers corresponding to the selected combination to be provided into the merging chute.

This kind of combination weighing device is required to properly supply the articles into all the weighing hoppers in order to work out the combination weighing value which is closest to a preset weight.

Patent Literature 2, WO 2009/078273, discloses a technique for properly supplying articles into pool hoppers and weighing hoppers by use of radial feeders. Each of radial feeders disclosed in Patent Literature 2 has a trough which is connected on its bottom surface to a first lead spring and a second leaf spring. These leaf springs have different natural frequencies. The first leaf spring is arranged to extend obliquely upward in a direction opposite to a feed direction of the articles to the pool hopper, and the second leaf spring is arranged to extend obliquely upward in the feed direction. When a vibrating source generates a vibration having a frequency which is near the natural frequency of the first leaf spring, its upper end oscillates obliquely upward in the feed direction around its lower end, causing the oscillation to be transmitted to the bottom surface of the trough. This causes the articles on the trough to be fed toward the pool hopper. In contrast, when the vibrating source generates a vibration having another frequency which is near the natural frequency of the second leaf spring, its upper end oscillates obliquely upward in the opposite direction around its lower end. This oscillation is transmitted to the bottom surface of the trough, causing the articles on the trough to be fed back to the opposite side of the pool hopper.

According to the technique disclosed in Patent Literature 2, by controlling a frequency of the vibrating source to move the articles forward and backward on the trough, and to adjust a feed rate of the articles in the feed direction, the articles can be properly conveyed by the radial feeders.

Patent Literature 1: JP H06-074814 A
Patent Literature 2: WO 2009/078273

In the conventional combination weighing device, the dispersion table of the dispersion feed unit typically discharges the articles provided from one upper place to multiple radial feeders. The conventional dispersion feed unit can control a single dispersion table only to perform a single movement, making it difficult to precisely control a discharge of the articles to multiple discharge sections. In particular, when a dispersion table in the shape of a semicircle in planar view is used, the articles on the dispersion table tend to concentrate on one side in its circumferential direction and to be insufficient on another side in the circumferential direction. This can incur a quantitative deficiency or excess of the articles in some discharge sections. The conventional solution for this problem is only to adjust a position of the one upper place for providing the articles to the dispersion table.

The above technique of Patent Literature 2 for making a feed of articles more appropriate have applied only to a simple type of radial feeders which feed the articles supplied from one place to one discharge section, not yet to more complicate types of feeders or tables which is adapted to feed the articles supplied from one or more places to multiple discharge sections, because correspondence relationships between one or more supply places and multiple discharge sections are complicated.

A purpose of the invention is to enable articles to be properly supplied from a dispersion table to multiple sections.

SUMMARY OF THE INVENTION

For this purpose, a dispersing feed device of the invention includes:

a dispersion table adapted to receive articles supplied from above and to feed the articles to multiple sections on a periphery of the dispersion table;

a first elastic unit inclinedly connected to the dispersion table, the first elastic unit having a first natural frequency;

a second elastic unit connected to the dispersion table inclinedly in a direction different from the inclination direction of the first elastic unit, the second elastic unit having a second natural frequency which is different from the first natural frequency; and at least one vibrating source adapted to vibrate the dispersion table through the first and second elastic units.

According to the dispersing feed device of the invention, when the vibrating source generates a vibration in a frequency being equal to or near the first natural frequency, amplitude of the vibration of the first elastic unit increases to enable a feed rate of the articles on the dispersion table in a direction corresponding to an obliquity of the first elastic unit to increase. Also, when the vibrating source generates a vibration in a frequency being equal to or near the second natural frequency, amplitude of the vibration of the second elastic unit increases to enable a feed rate of the articles on the dispersion table in a direction corresponding to an obliquity of the second elastic unit to increase. Accordingly, adjusting the frequency of the vibration generated by the vibrating source enables a feed direction and a feed rate of the articles on the dispersion table to be properly adjusted, inhibiting the articles from concentrating one part and being insufficient on another part on the dispersion table. This enables the articles on the dispersion table to be properly supplied to multiple sections on the periphery of the table.

When the dispersing feed device of the invention includes multiple elastic unit groups each having the first and second elastic units, the groups may be connected to the dispersion table at positions different from each other in a circumferential direction thereof. This enables loads on the elastic unit groups from the dispersion table to be dispersed, enhancing permanence of the first and second elastic units.

In the dispersing feed device of the invention, when the dispersion table has a circular or arc-like periphery in planar view, the multiple elastic unit groups may be arranged at different angles in planar view. This enables directions of vibrations acted on the dispersion table to vary with position in the circumferential direction of the table. This allows the articles on the dispersion table to be fed in torsion direction in planar view, enabling unevenness of density of the articles on the dispersion table to be effectively decreased.

When the dispersing feed device of the invention includes multiple vibrating sources, the dispersing feed device may further include at least one drive unit adapted to drive the vibrating sources at different vibration frequencies. In this case, if the multiple vibrating sources are driven in different frequencies, amplitude of the vibrations of the first and the second elastic units can be adjusted individually. Therefore, a direction and amplitude of a composite vibration transmitted from each elastic unit group to the dispersion table can be more precisely adjusted, enabling the articles to be fed from a certain position on the dispersion table to desired position on the periphery of the table, which allows feed amount of the articles to each section of the periphery of the dispersion table to be precisely adjusted.

When the dispersing feed device of the invention includes a counterweight connected to the dispersion table through the first and second elastic units which are connected in series with each other between the dispersion table and the counterweight, an upper end portion of the first elastic unit may be connected to the dispersion table, an upper end portion of the second elastic unit may be connected to the counterweight, and lower end portions of the first and second elastic units may be connected to each other. In this case, the lower end portion of the first elastic unit (which extends obliquely downward at one angle from the dispersion table) and the lower end portion of the second elastic unit (which extends obliquely downward at another angle from the counterweight) are serially connected between the dispersion and the counterweight. This allows the counterweight, the dispersion table, the first elastic unit and the second elastic unit to be arranged compactly in a vertical direction as a whole, unlike in the case that an upper end portion of the second elastic unit extending obliquely upward from the counterweight is connected to a lower end portion of the first elastic unit.

When the dispersing feed device of the invention includes a connecting member connecting the first and second elastic units to each other, the connecting member may have a horizontal portion arranged horizontally and a rising portion extending upward from the horizontal portion. Also, in this case, the first elastic unit may extend obliquely downward from a connection with the dispersion table toward one side of the circumferential direction and may be connected on its lower end portion to the rising portion. Further, in this case, the second elastic unit may extend obliquely downward from a connection with the counterweight toward the other side of the circumferential direction and may be connected on its lower end portion to the horizontal portion. This allows the first elastic unit which extends obliquely downward from the connection with the dispersion table toward one side of the circumferential direction, and the second elastic unit which extends obliquely downward from the connection with the counterweigh toward the other side of the circumferential direction to be connected compactly in the vertical and circumferential directions through the connecting member having the horizontal portion and the rising portion.

The dispersing feed device of the invention may further include a dispersion unevenness detecting unit adapted to detect unevenness of dispersion of the articles on the dispersion table, and a control unit adapted to control a vibration frequency of a vibration generated by the at least one vibrating source based on dispersion unevenness detected by the dispersion unevenness detecting unit. This enables the feed direction and feed rate of the articles on the dispersion table to be adjusted to inhibit the articles from concentrating one part and being insufficient on another part on the dispersion table, by controlling the frequency of the vibration generated by the vibrating source to control the amplitudes of the vibrations of the first and second elastic units.

A combination weighing device of the invention includes:

the above dispersing feed device;

multiple weighing hoppers arrayed in the circumferential direction around the dispersion table, the weighing hoppers each adapted to hold the articles supplied from the dispersion table;

weight measuring units adapted to measure a weight of the articles held by each of the weighing hoppers;

a calculation unit adapted to calculate a target value of feed amount of the articles to each of the weighing hoppers based on the weights measured by the weight measuring units; and a control unit adapted to control a vibration frequency of a vibration generated by the at least one vibrating source based on the target value calculated by the calculation unit.

The combination weighing device of the invention allows the feed direction and feed rate of the articles on the dispersion table to be adjusted to make feed amount of the articles to each weighing hopper closer to a targeted value, by controlling the frequency of the vibration generated by the vibrating source to control the amplitudes of the vibrations of the first and second elastic units. This causes an appropriate amount of articles to be supplied to each weighing hopper, enhancing the accuracy of combination weighing.

The combination weighing device of the invention may further include a dispersion unevenness detecting unit adapted to detect unevenness of dispersion of the articles on the dispersion table. Also, in this case, the control section may be adapted to control the vibration frequency of the vibration generated by the at least one vibrating source based on the target value calculated by the calculation unit and the unevenness of dispersion of the articles detected by the dispersion unevenness detecting unit. This inhibits unevenness of dispersion of the articles on the dispersion table and allows feed amount of the articles from the dispersion table to each weighing hopper to be precisely adjusted to the targeted value.

Effects of the Invention

According to the invention, the feed direction and feed rate of the articles on the dispersion table can be properly adjusted, by adjusting the frequency of the vibration generated by the vibrating source. This inhibits unevenness of dispersion of the articles on the dispersion table and allows the articles to be fed to multiple sections on the periphery of the dispersion table.

EMBODIMENTS OF THE INVENTION

With reference to the accompanying drawings, embodiments of the present invention will be described below.

Combination Weighing Device

Figure 1:
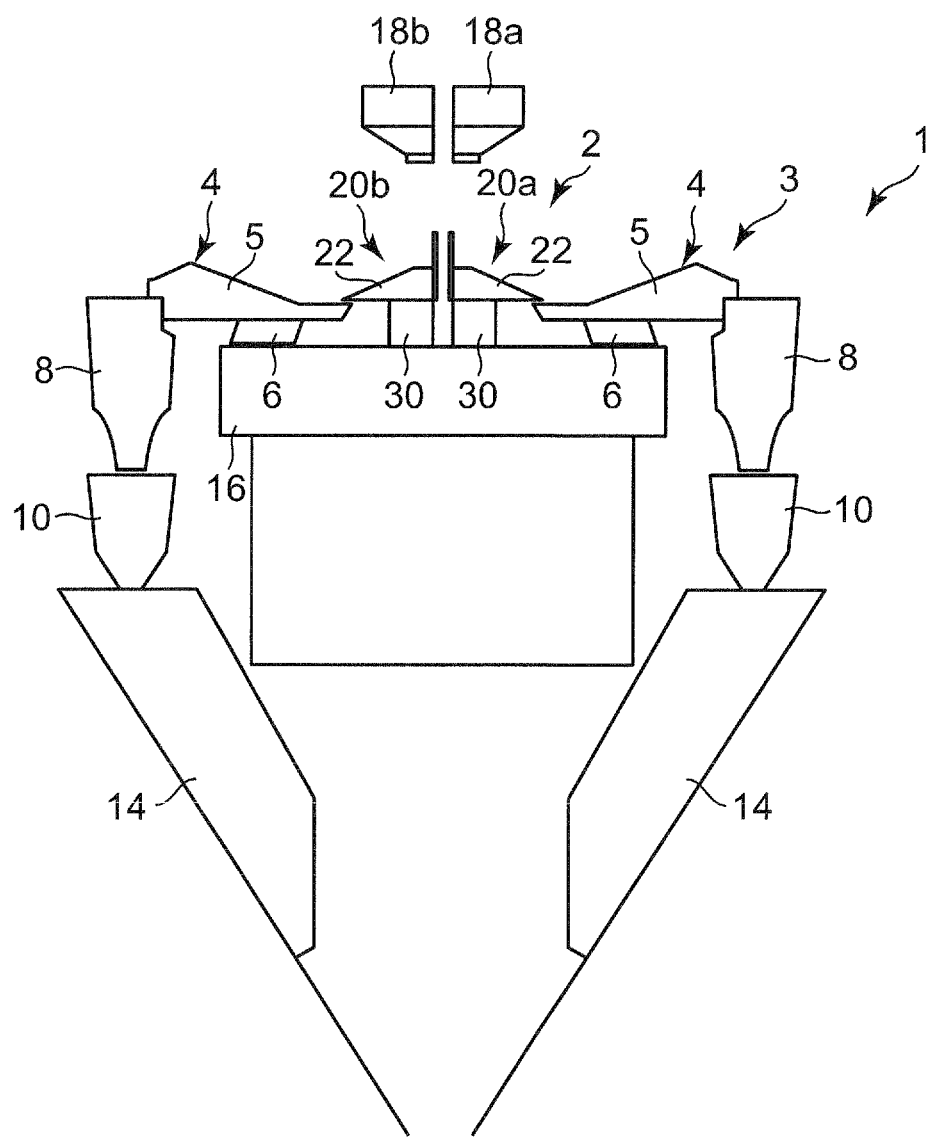
FIG. 1 is a schematic cross sectional view showing a combination weighing device having a dispersing feed device according to the first embodiment of the invention.
Figure 2:
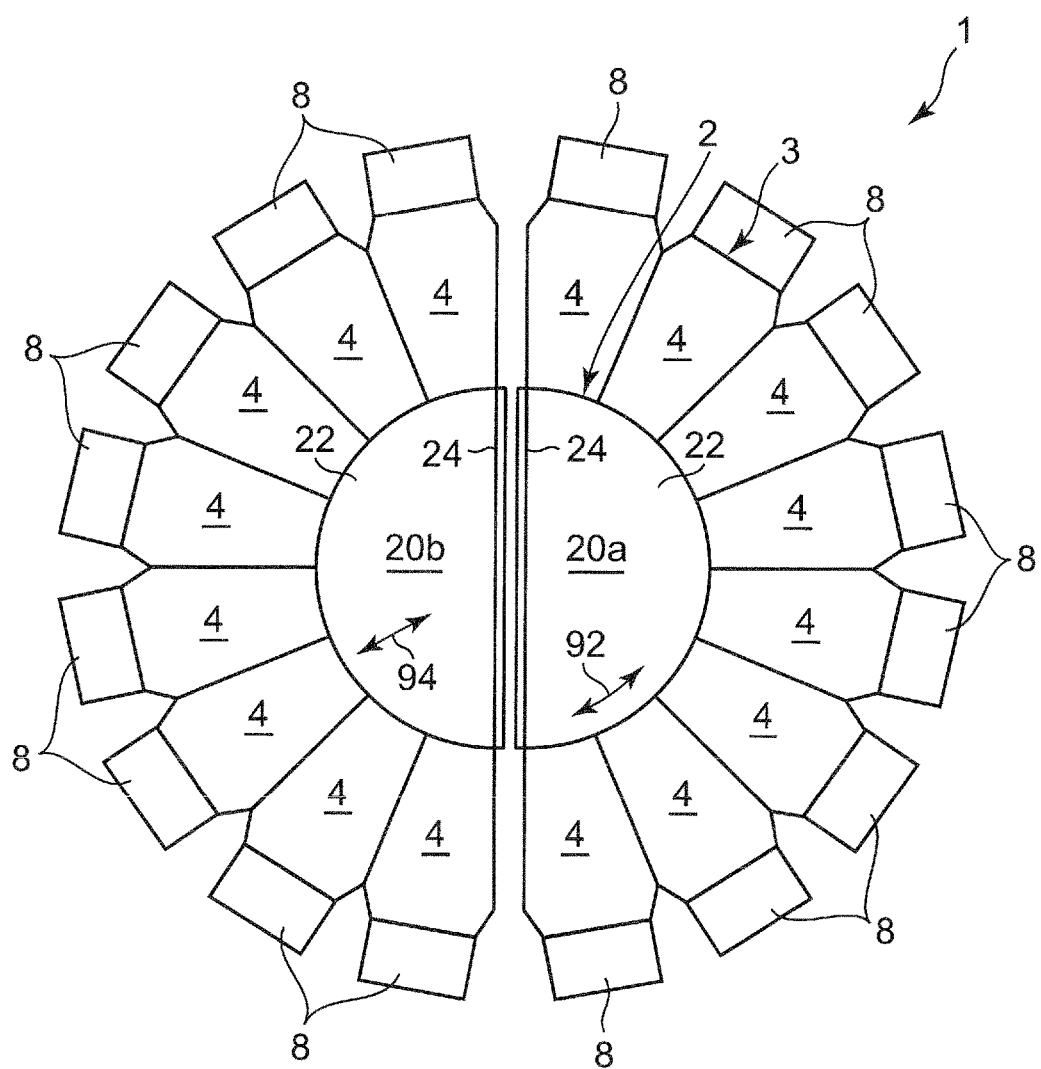
FIG. 2 is a schematic plan view of the combination weighing device shown in FIG. 1.
Figure 3:
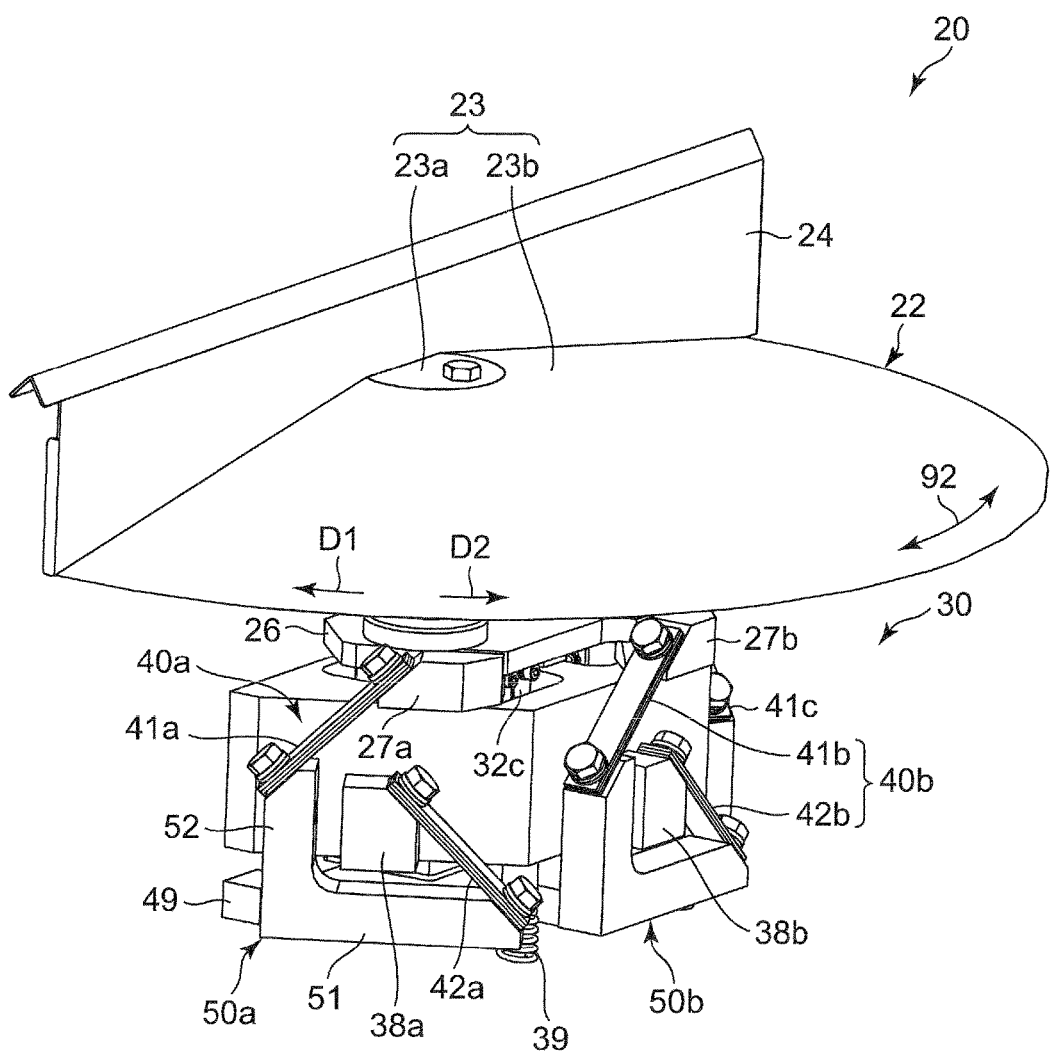
FIG. 3 is a perspective view showing the dispersing feed device according to the first embodiment.
Figure 4:
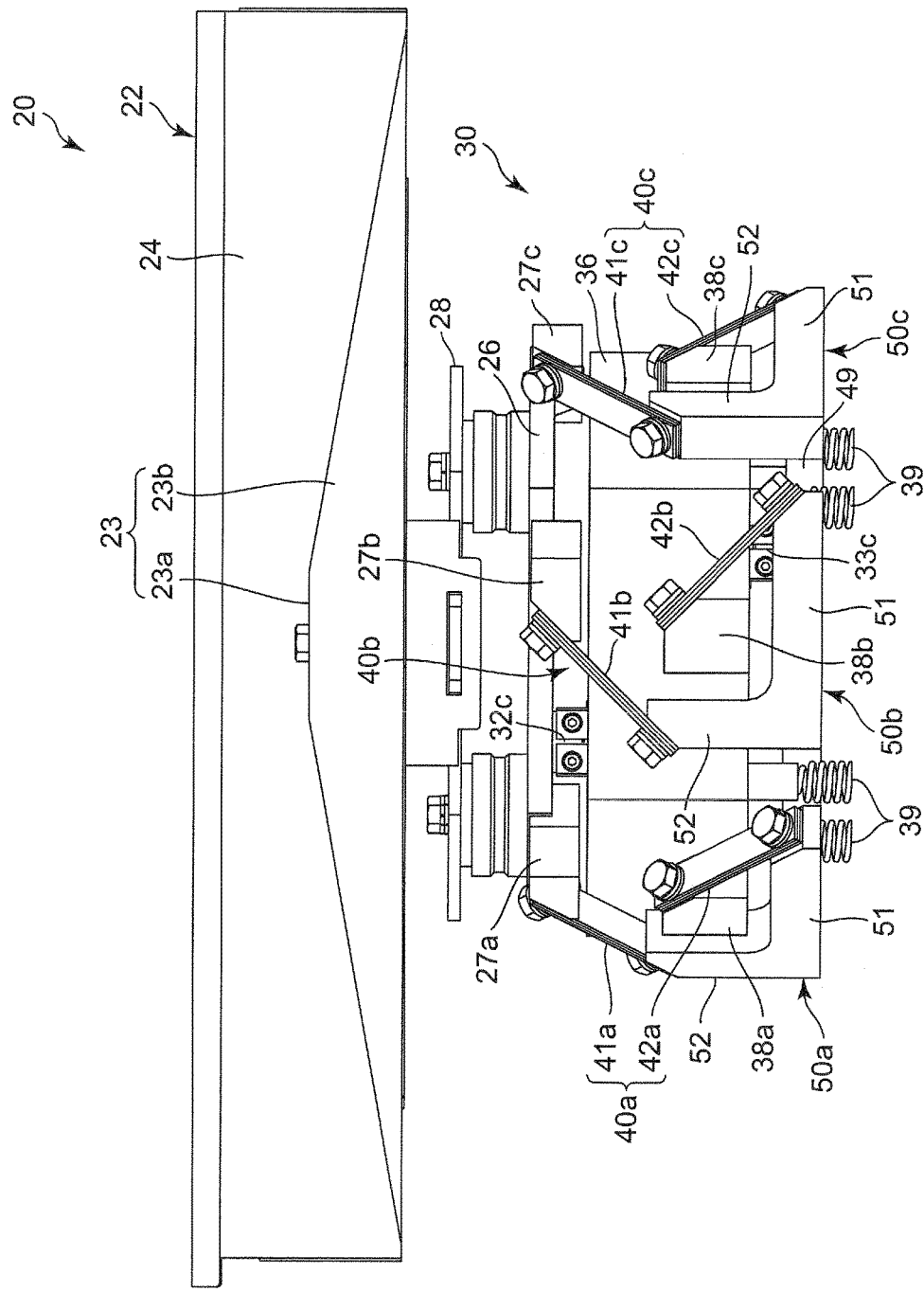
FIG. 4 is a side elevational view of the dispersing feed device shown in FIG. 3.
Figure 5:
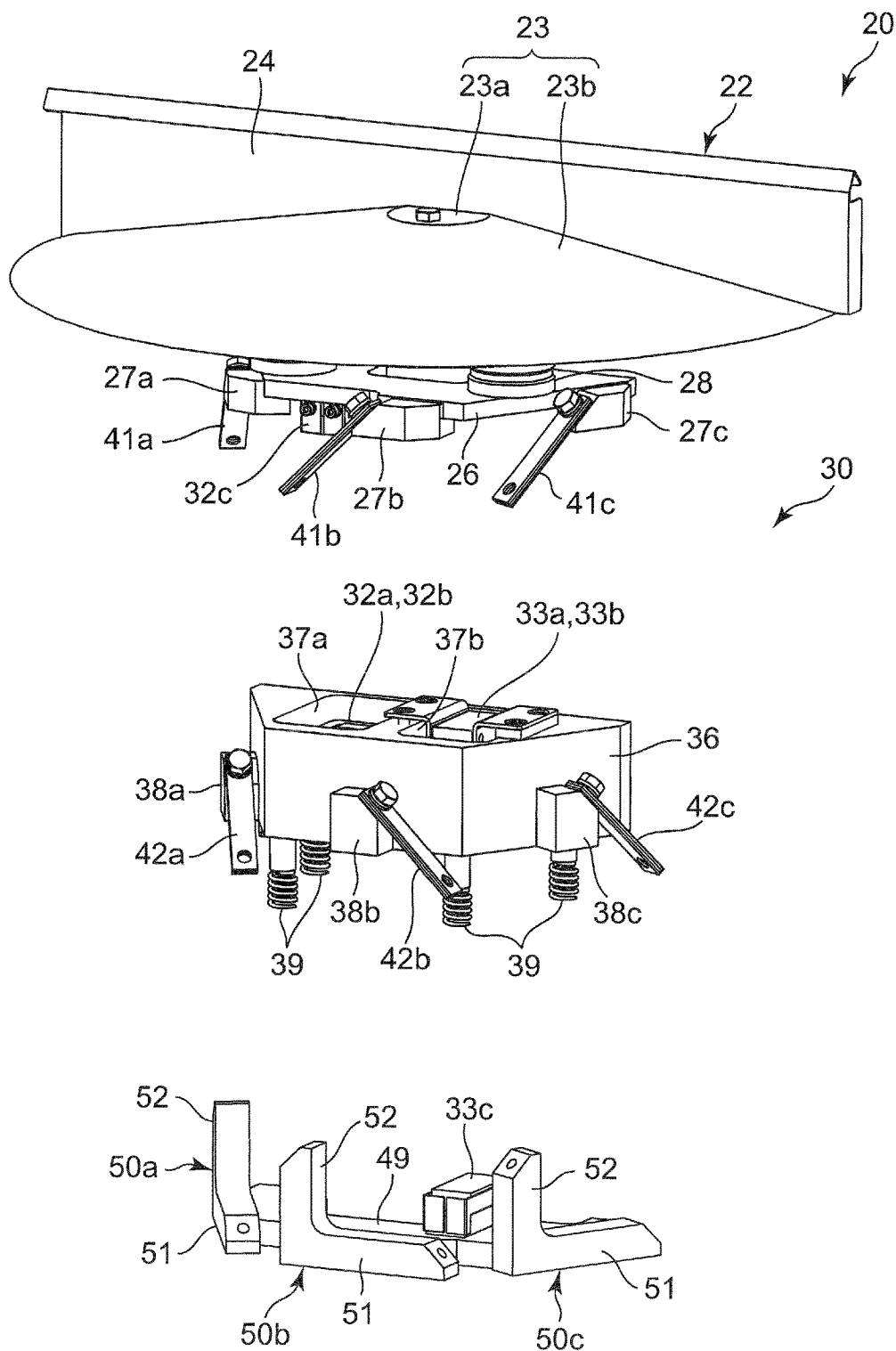
FIG. 5 is an exploded perspective view of the dispersing feed device shown in FIG. 3.
Figure 6:
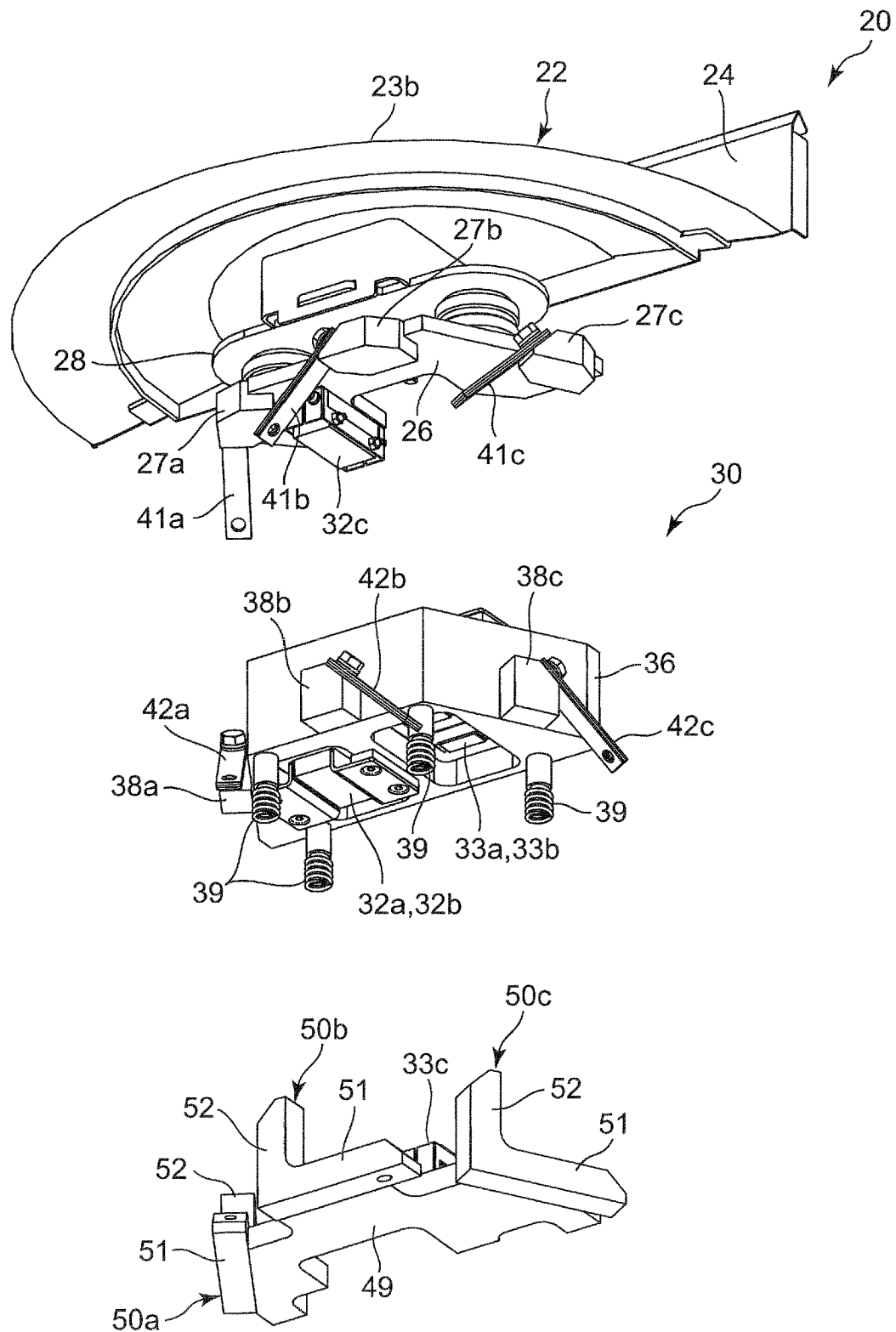
FIG. 6 is an exploded perspective view of the dispersing feed device viewed from a direction different from FIG. 5.

FIG. 1 and FIG. 2 show a combination weighing device (hereinafter, simply referred to as "weighing device") 1 according to one embodiment of the present invention.

As shown in FIG. 1 and FIG. 2, the weighing device 1 includes: a dispersing feed element 2 having a dispersing feed device described later; an annular delivery element 3 which surrounds the dispersing feed element 2; a plurality of pool hoppers 8 disposed below an outer peripheral portion of the delivery element 3; a plurality of weighing hoppers 10 disposed below the pool hoppers 8; a merging chute 14 disposed below the weighing hoppers 10; and a frame 16 which supports these constitutional elements.

Figure 11:
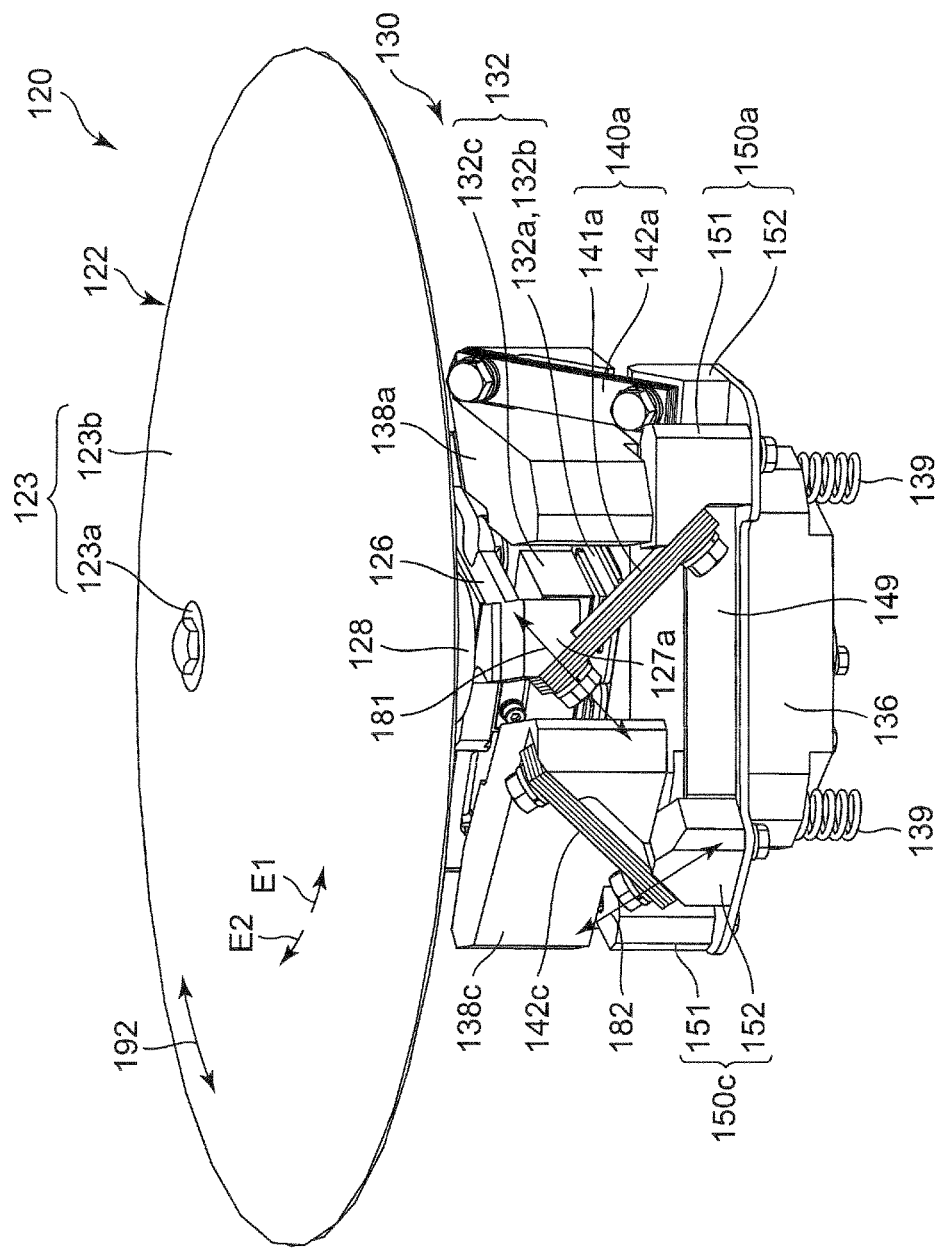
FIG. 11 is a perspective view showing a dispersing feed device according to the second embodiment.
Figure 12:
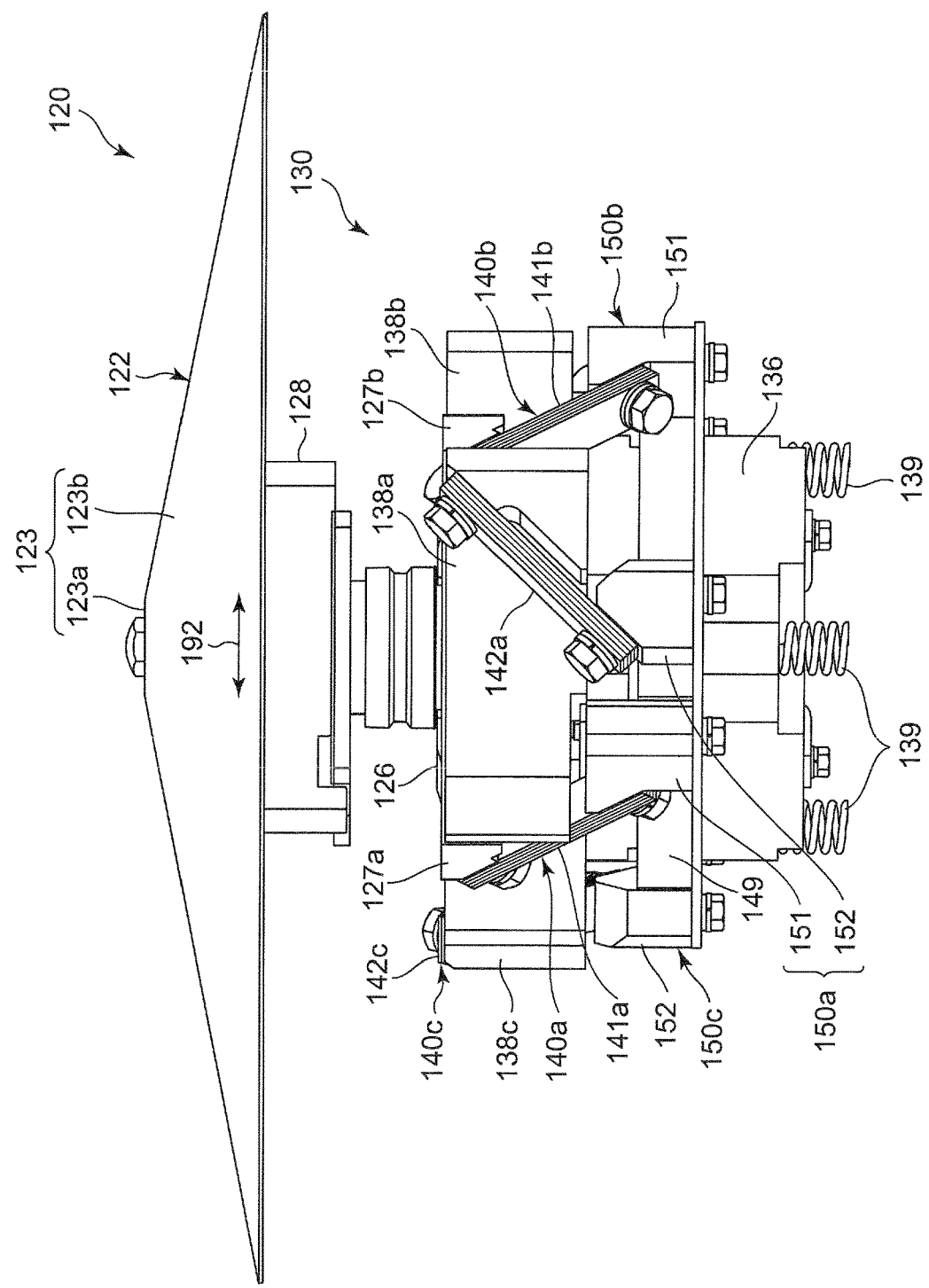
FIG. 12 is a side elevational view of the dispersing feed device shown in FIG. 11.
Figure 13:
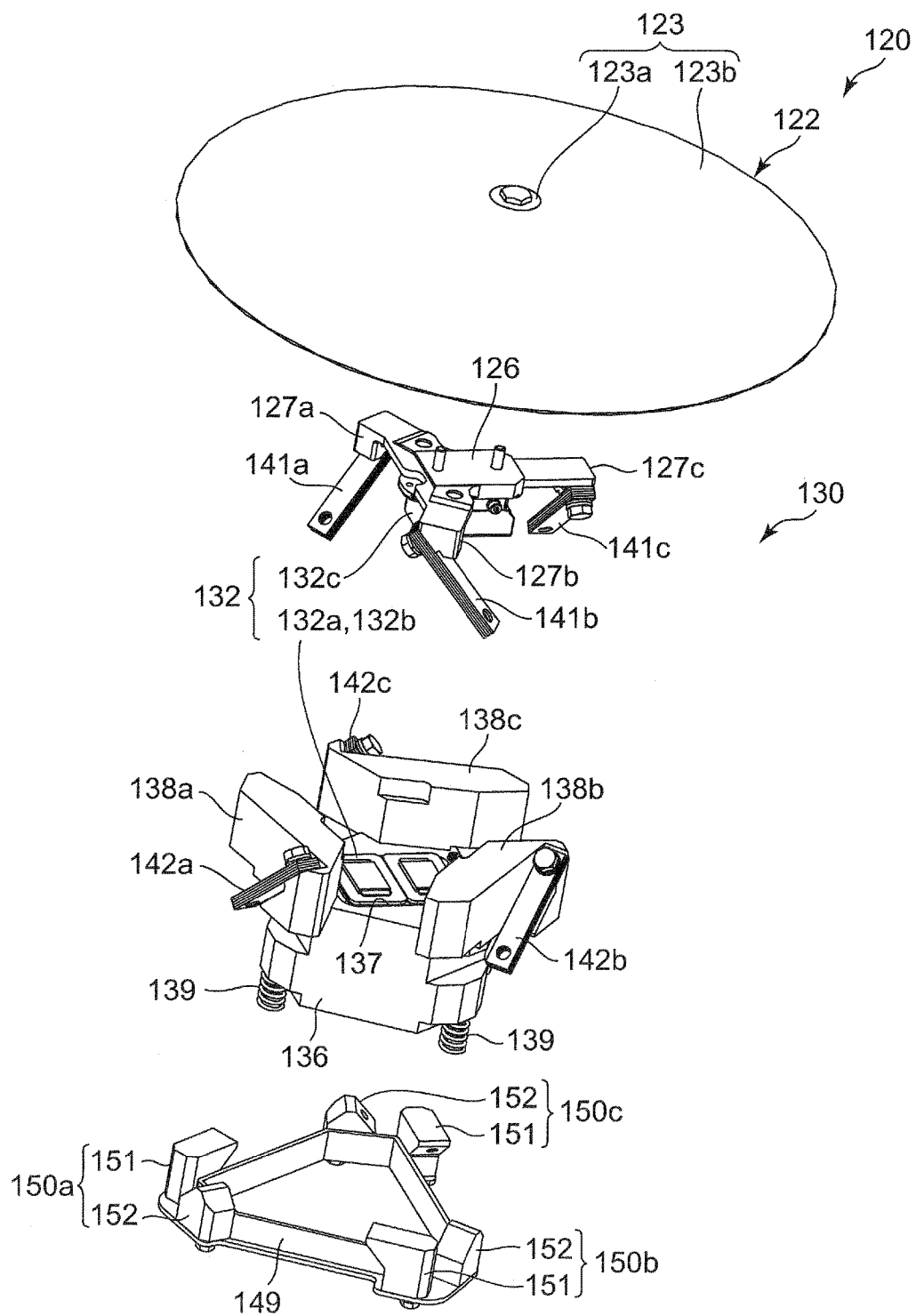
FIG. 13 is an exploded perspective view of the dispersing feed device shown in FIG. 11.

The dispersing feed element 2 is formed of one or a plurality of dispersing feed devices. For example, in the first embodiment described later, the dispersing feed element 2 is formed by combining two dispersing feed devices 20 (20*a*, 20*b*), while in a second embodiment described later, the dispersing feed element 2 is formed of only one dispersing feed device 120. However, the dispersing feed element 2 may be formed by combining three or more dispersing feed devices. The specific structure of the dispersing feed device is described for respective embodiments later. Regardless of the number of dispersing feed devices, the dispersing feed element 2 includes one conical dispersion table 122 (see FIG. 11) or a plurality of dispersion tables 22 formed to be split in a circumferential direction which form a conical shape as a whole. The dispersing feed element 2 includes a vibration mechanism 30 which applies vibrations to the dispersion table.

The delivery element 3 includes a plurality of radial feeders 4 arranged in a circumferential direction 92 of the dispersion table 22 (see FIG. 2). The radial feeder 4 includes: a trough which extends radially from a periphery of the dispersion table 22; and a conveying unit 6 which conveys articles on the trough 5 to the pool hopper 8. The conveying unit 6 is, for example, a vibrator which moves the articles on the trough 5 by applying vibrations to the trough 5. However, a mechanism for conveying the articles on the trough 5 is not limited to a vibration-applying-type mechanism and, for example, a rotary-drive-type conveying unit which includes a rotationally drivable coil unit on the trough 5 may be provided in place of the vibration-applying-type conveying unit 6.

The pool hopper 8 and the weighing hopper 10 are provided for every radial feeder 4, and are disposed below an outer end portion of the trough 5 of the corresponding radial feeder 4 in the radial direction 94 (see FIG. 2).

With the weighing device 1 having the above-mentioned configuration, articles (object whose weight is to be measured) having a weight near a set weight can be acquired through following operations.

First, articles are dropped from the supply conveyers 18 (18*a*, 18*b*) disposed above the dispersion table 22 and supplied onto the dispersion table 22. The articles on the dispersion table 22 are fed to the outside in a radial direction due to inclination of an upper surface of the dispersion table 22 while being distributed in a circumferential direction due to vibrations of the dispersion table 22 generated by the vibration mechanism 30, and the articles are dropped and supplied to the troughs 5 of the radial feeders 4.

The articles on each trough 5 are conveyed toward the outside in the radial direction 94 (see FIG. 2) by the radial feeder 4, and are dropped and supplied to the pool hopper 8. Subsequently, the articles are temporarily held by the pool hopper 8 and, thereafter, the articles are dropped and supplied to the weighing hopper 10.

Figure 10:
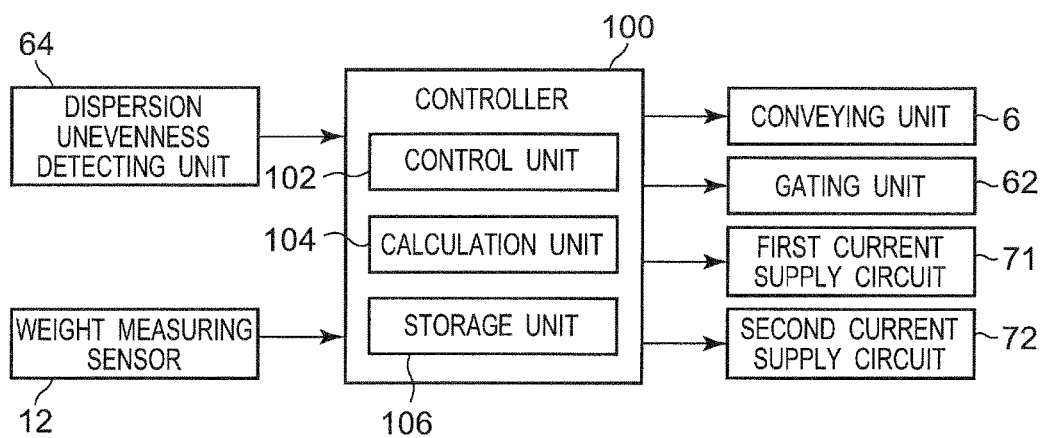
FIG. 10 is a block diagram of a control system of the combination weighing device.

Weights of the articles stored in the plurality of weighing hoppers 10 are measured by weight measuring sensors 12 (see FIG. 10). The weight measuring sensor 12 is formed of a load cell provided for every weighing hopper 10, for example. Measured weight values of the weight measuring sensors 12 are combined with each other by a control unit 102 of a controller 100 described later (see FIG. 10) to acquire a plurality of combined measured weight values. Then, the combination which is closest to the set weight is selected by the control unit 102 among the combined measured weight values, and gates (not shown in the drawing) of the plurality of weighing hoppers 10 corresponding to the selected combination are opened. The articles in the plurality of weighing hoppers 10 whose gates are opened are dropped and supplied to the merging chute 14. Accordingly, the articles having a weight near the set value can be obtained.

Dispersing Feed Device

Hereinafter, the specific configuration of the dispersing feed device is described for every embodiment.

First Embodiment

As show in FIG. 1 and FIG. 2, in the first embodiment, two dispersing feed devices 20 (20a, 20b) having the same structure are mounted on the weighing device 1. Each dispersing feed device 20a, 20b includes a dispersion table 22 having a semicircular shape in planar view. Two dispersing feed devices 20a, 20b are disposed adjacently to each other such that these dispersion tables 22 are combined in an approximately conical shape.

As shown in FIG. 1, above the dispersion tables 22 of the respective dispersing feed devices 20a, 20b, the supply conveyers 18a, 18b corresponding to the dispersion tables 22 are disposed individually. With such a configuration, it is possible to supply articles of different kinds to two dispersion tables 22. However, articles of the same kind may be supplied to two dispersion tables 22 from one supply conveyer 18. In any cases, articles are supplied to the respective dispersion tables 22 from one place above the dispersion tables 22. However, articles may be supplied to the dispersion tables 22 from a plurality of places above the dispersion tables 22.

The vibration mechanism 30 is provided in every dispersion table 22. With such a configuration, vibrations are applied to two dispersion tables 22 individually by the vibration mechanism 30 corresponding to the dispersion tables 22. However, common vibrations may be applied to two dispersion tables 22 by the common vibration mechanism 30.

A specific example of the structure of the dispersing feed device 20 is described with reference to FIG. 3 to FIG. 8.

As shown in FIG. 3 to FIG. 6, the dispersing feed device 20 includes the single dispersion table 22. The dispersion table 22 includes: a table body 23; and table base 26 which supports the table body 23 by way of connecting units 28.

The table body 23 is formed of a sheet of plate-like member having a semi-conical shape, for example. An upper surface of the table body 23 has: a central portion 23a having an approximately semicircular shape which is disposed approximately horizontally; and an inclined surface portion 23b which expands radially outward in an oblique downward direction from the central portion 23a. An outer peripheral portion of the inclined surface portion 23b is formed into an arcuate shape in planar view, and is disposed at substantially the same height over the entire length. Although the central portion 23a and the inclined surface portion 23b are formed of a flat surface, for example, unevenness may be provided to the inclined surface portion 23b when necessary. For example, a plurality of ribs extending in a radial direction may be formed on the inclined surface portion 23b, and articles on the inclined surface portion 23b may be guided to the respective radial feeders 4 (see FIG. 1 and FIG. 2) by these ribs.

A bulkhead 24 is fixed to the table body 23. The bulkhead 24 is disposed along a vertical direction. The bulkhead 24 is disposed so as to close both end portions of the table body 23 in the circumferential direction 92.

The table base 26 is integrally formed with the table body 23 by way of the connecting units 28. When vibrations are applied to the table base 26, the table body 23 is integrally vibrated together with the table base 26. Mounting units 27a, 27b, 27c are mounted on a plurality of places on an outer peripheral portion of the table base 26 in the circumferential direction 92, and one end portions of first elastic units 41 (41a, 41b, 41c) described later are mounted on the mounting units 27a, 27b, 27c. The plurality of these mounting units 27a, 27b, 27c are arranged such that distances from the central portion 23a to the respective mounting units 27a, 27b, 27c are equal to each other and heights of the mounting units 27a, 27b, 27c are equal to each other.

The vibration mechanism 30 includes: a plurality of elastic unit groups 40 (40a, 40b, 40c) each having a first elastic unit 41 (41a, 41b, 41c) and a second elastic unit 42 (42a, 42b, 42c); a counterweight 36 connected to the dispersion table 22 by way of the elastic unit groups 40 (40a, 40b, 40c); and vibrating sources 32, 33 which vibrate the dispersion table 22 by way of the elastic unit groups 40 (40a, 40b, 40c).

The counterweight 36 is disposed below the table base 26 of the dispersion table 22. Mounting units 38a, 38b, 38c are mounted on a plurality of places on an outer peripheral portion of the counterweight 36 in the circumferential direction 92. One end portions of the second elastic units 42 (42a, 42b, 42c) are mounted on the mounting units 38a, 38b, 38c. A pair of through holes 37a, 37b (see FIG. 5) which extends in a vertical direction is formed in the counterweight 36.

The counterweight 36 is mounted on the frame 16 (see FIG. 1) by way of a plurality of foot units 39 projecting downward from the counterweight 36. The foot unit 39 includes a coil spring which is extendable and shrinkable in a vertical direction. Vibrations of the counterweight 36 are damped by the coil springs. With such a configuration, the transmission of vibrations to the frame 16 from the dispersing feed devices 20a, 20b is inhibited.

A connecting base 49 is disposed below the counterweight 36. A plurality of connection members 50a, 50b, 50c are fixed to a plurality of places on an outer peripheral portion of the connecting base 49 in the circumferential direction 92, and the plurality of connection members 50a, 50b, 50c are provided for the respective elastic unit groups 40a, 40b, 40c. With such a configuration, the plurality of connection members 50a, 50b, 50c are integrally formed with each other by way of the common connecting base 49.

Each connection member 50 (50a, 50b, 50c) includes: a horizontal portion 51 disposed approximately horizontally; and a rising portion 52 which is raised from the horizontal portion 51. The horizontal portion 51 extends linearly along the circumferential direction 92. The rising portion 52 extends upward from one end portion of the horizontal portion 51.

In this embodiment, the vibrating sources are the first vibrating source 32 and the second vibrating source 33. The first vibrating source 32 includes: a magnet coil 32a and a stationary core 32b mounted on the counterweight 36; and a movable core 32c mounted on the table base 26 of the dispersion table 22. The second vibrating source 33 includes: a magnet coil 33a and a stationary core 33b mounted on the counterweight 36; and a movable core 33c mounted on the connecting base 49. The magnet coil 32a and the stationary core 32b of the first vibrating source 32 are housed in one through hole 37a (see FIG. 5) formed in the counterweight 36, and the magnet coil 33a and the stationary core 33b of the second vibrating source 33 are housed in the other through hole 37b (see FIG. 5) formed in the counterweight 36.

A first current supply circuit 71 (see FIG. 8) is electrically connected to the magnet coil 32a of the first vibrating source 32, and a second current supply circuit 72 (see FIG. 8) is electrically connected to the magnet coil 33a of the second vibrating source 33. When an AC current flows into the magnet coils 32*a*, 33*a*, a vibration magnetic field is generated so that the movable cores 32*c*, 33*c* vibrate in a vertical direction.

Figure 7:
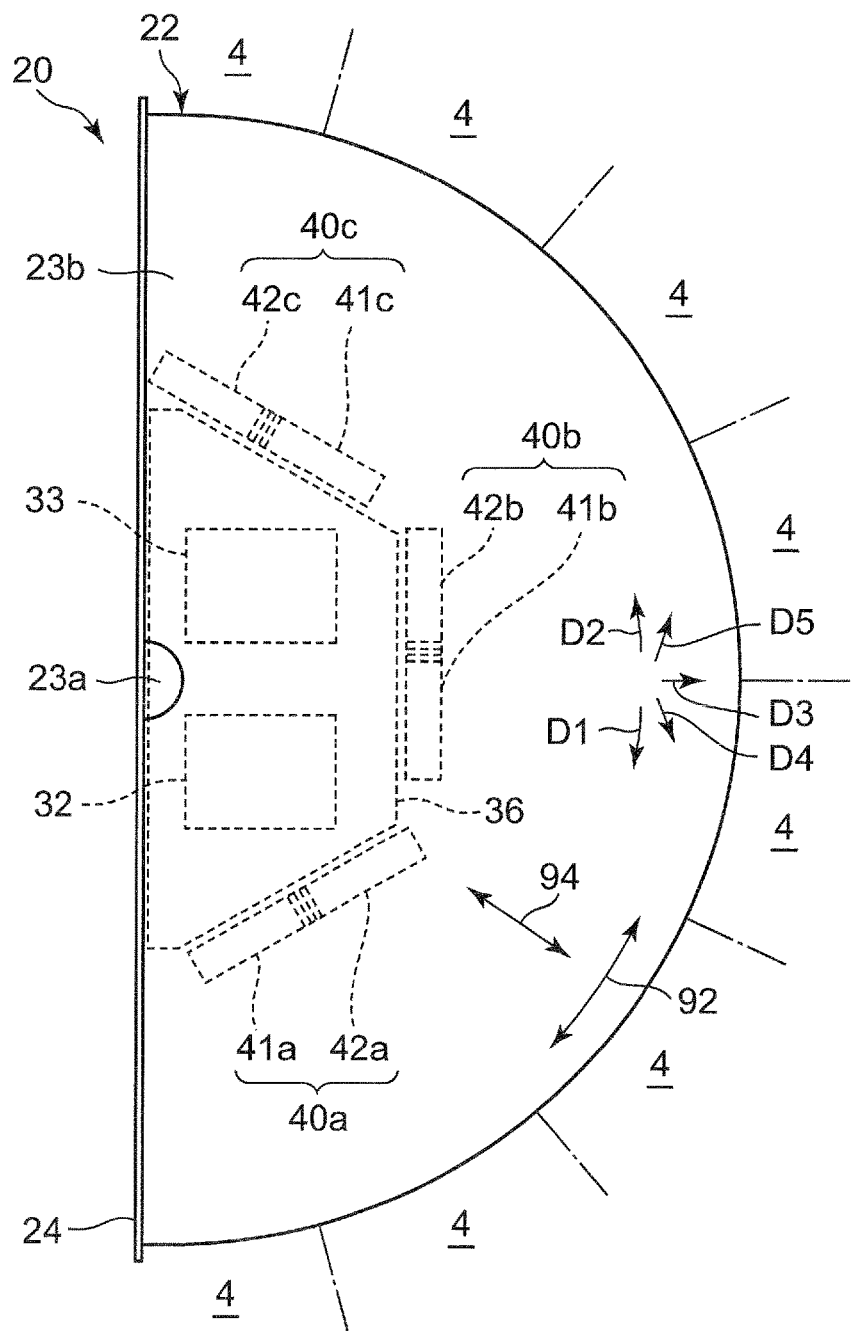
FIG. 7 is a top view showing an arrangement of major elements of the dispersing feed device shown in FIG. 3.

The plurality of elastic unit groups 40 (40*a*, 40*b*, 40*c*) are arranged at different positions in the circumferential direction 92 (see FIG. 7). In this embodiment, three elastic unit groups 40*a*, 40*b*, 40*c* are arranged at angular intervals of 60° in planar view. However, the number of elastic unit groups is not limited to such a number.

The plurality of elastic unit groups 40*a*, 40*b*, 40*c* are disposed parallel to each other between the dispersion table 22 and the counterweight 36. In each elastic unit group 40 (40*a*, 40*b*, 40*c*), the first elastic unit 41 (41*a*, 41*b*, 41*c*) and the second elastic unit 42 (42*a*, 42*b*, 42*c*) are connected in series by way of the connection member 50 (50*a*, 50*b*, 50*c*).

Each of the first elastic unit 41 and the second elastic unit 42 is formed of an elongated member where the other end portion in a length direction is easily vibrated in a deflecting direction using one end portion in the length direction as a fulcrum. To be more specific, the first elastic unit 41 and the second elastic unit 42 are formed of a plurality of stacked leaf springs, for example. In this case, natural frequencies of the first elastic unit 41 and the second elastic unit 42 can be easily adjusted by changing the number of leaf springs. The first elastic unit 41 has first natural frequency f1, and the second elastic unit 42 has second natural frequency f2 which differs from the first natural frequency f1.

The first elastic unit 41 is inclinedly disposed with respect to a vertical direction. The second elastic unit 42 is inclinedly disposed in a direction which differs from the inclination direction of the first elastic unit 41 with respect to the vertical direction. Although the inclination directions of the first elastic unit 41 and the second elastic unit 42 are not limited, for example, the first elastic unit 41 extends in a direction which is inclined downward toward one end in the circumferential direction 92 at an angle of 45°, and the second elastic unit 42 extends in a direction which is inclined downward toward the other end in the circumferential direction 92 at an angle of 45°. As viewed from the outside in the radial direction 94 (see FIG. 7), the difference between the first elastic unit 41 and the second elastic unit 42 in terms of the inclination angle is set to 90°. Although the difference in inclination angle as viewed from the outside in the radial direction is not limited to such an angle, it is preferable that the difference in inclination angle be 60° or more.

An upper end portion of the first elastic unit 41 is fixed to the mounting unit 27*a*, 27*b*, 27*c* of the dispersion table 22. A lower end portion of the first elastic unit 41 extending in an oblique downward direction toward one end in the circumferential direction 92 from a connection with the dispersion table 22 is fixed to an upper end portion of the rising portion 52 of the connection member 50. An upper end portion of the second elastic unit 42 is fixed to the mounting unit 38*a*, 38*b*, 38*c* of the counterweight 36. A lower end portion of the second elastic unit 42 extending in an oblique downward direction toward the other end in the circumferential direction 92 from a connection with the counterweight 36 is fixed to an end portion of the horizontal portion 51 of the connection member 50 on a side opposite to the rising portion 52. With such a configuration, the lower end portion of the first elastic unit 41 and the lower end portion of the second elastic unit 42 are connected to each other in a compact manner in a vertical direction and in the circumferential direction 92 by the connection member 50. The first elastic unit 41 and the second elastic unit 42 are arranged to overlap with each other in the vertical direction and in the circumferential direction 92. With such a configuration, the first elastic unit 41 and the second elastic unit 42 are formed in a further compact manner in these directions.

Figure 15:
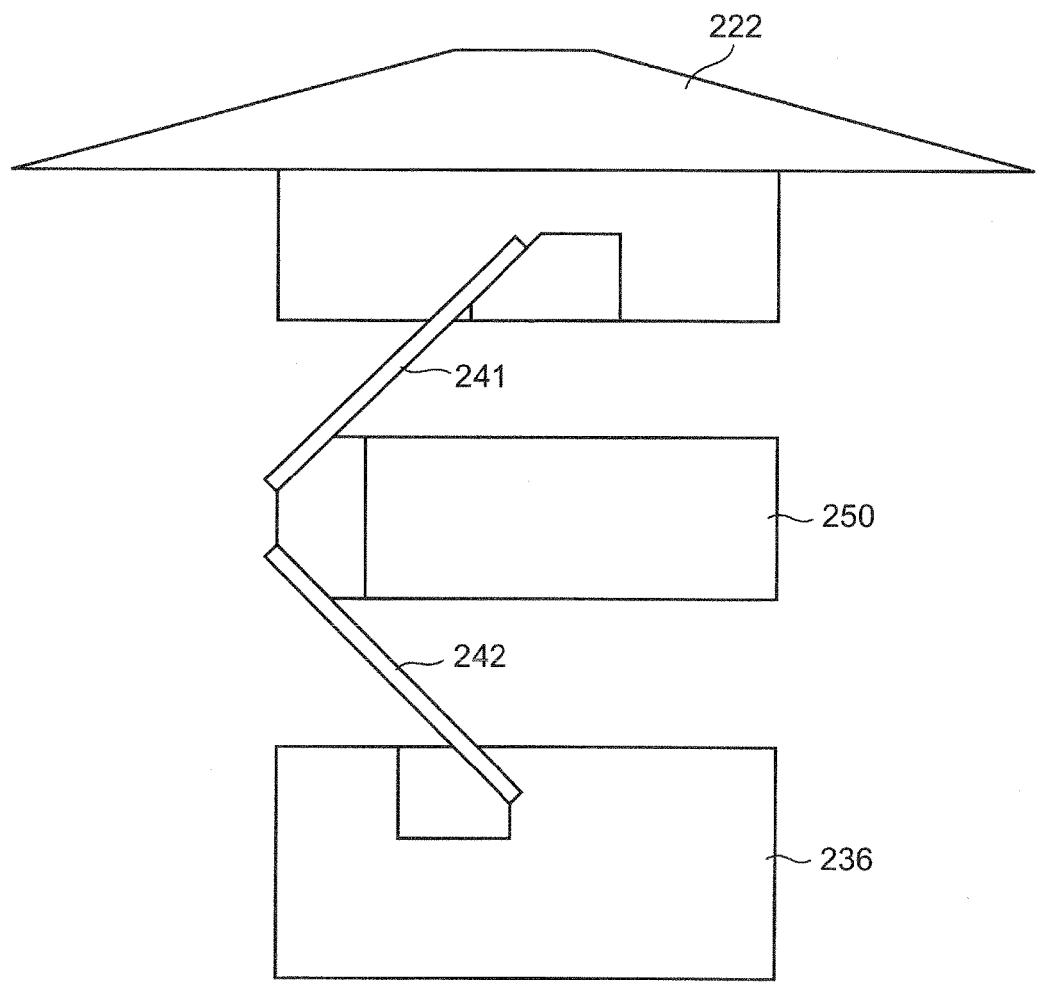
FIG. 15 is a schematic side elevational view showing a comparative example of the vibration mechanism.

The dispersing feed device of this embodiment is further described compared with a comparison example shown in FIG. 15. In the comparison example shown in FIG. 15, a first elastic unit 241 and a second elastic unit 242 are arranged at the same inclination angle in the same manner as this embodiment. Unlike the second elastic unit 42 of this embodiment where the upper end portion is connected to the counterweight 36 and the lower end portion is connected to the connection member 50, the second elastic unit 242 of the comparison example is configured such that an upper end portion is connected to a connection member 250 and a lower end portion is connected to a counterweight 236. That is, in the comparison example, a lower end portion of the first elastic unit 241 extending in an oblique downward direction from a dispersion table 222 and the upper end portion of the second elastic unit 242 extending in an oblique upward direction from the counterweight 236 are connected to each other by way of the connection member 250. With such a connection structure, it is necessary to increase a distance in a vertical direction between the dispersion table 222 and the counterweight 236 and hence, the dispersing feed device becomes large-sized in the vertical direction as a whole. To the contrary, according to this embodiment, the lower end portion of the first elastic unit 41 and the lower end portion of the second elastic unit 42 are connected to each other and hence, it is possible to realize the compact arrangement in the vertical direction as a whole as described previously.

Operation of Dispersing Feed Device

Figure 8:
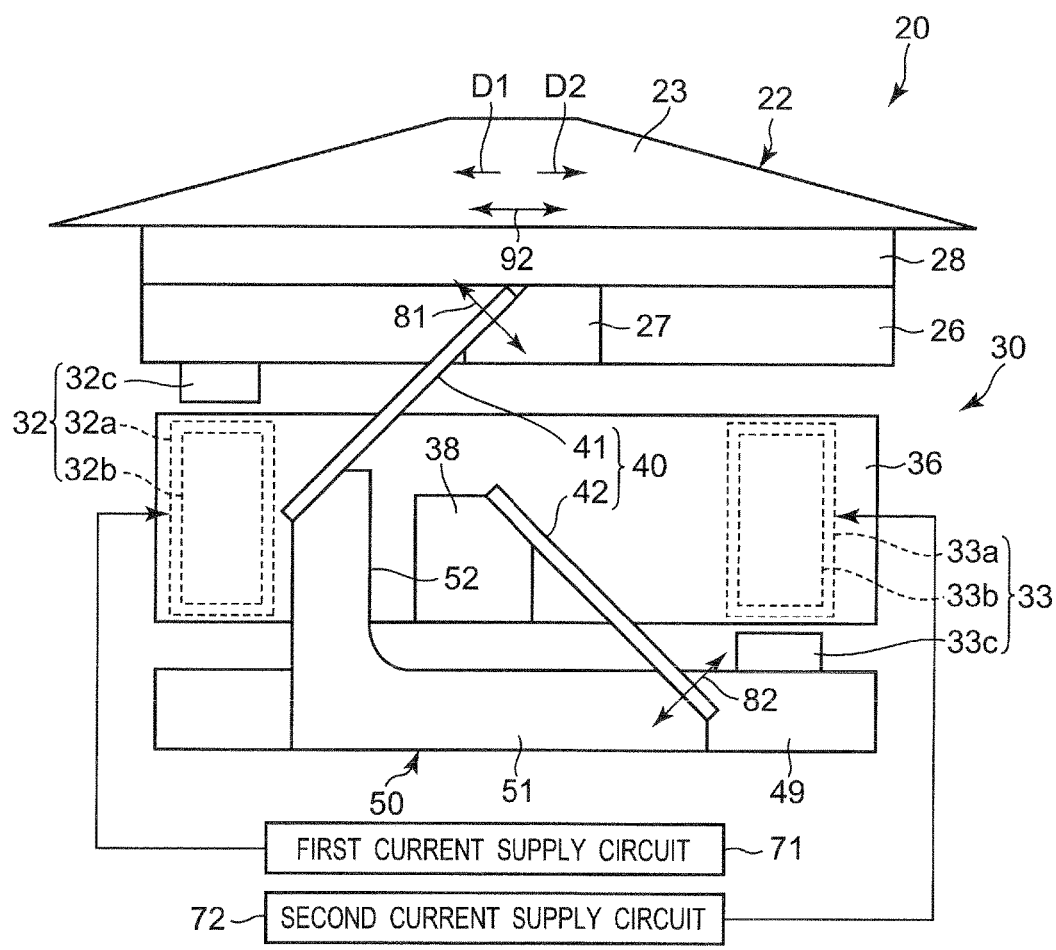
FIG. 8 is a schematic side elevational view of the dispersing feed device shown in FIG. 3 for illustrating a vibration mechanism thereof.

The operation of the dispersing feed device 20 is described with reference to FIG. 7 to FIG. 9.

FIG. 7 is a plan view showing the arrangement of the dispersion table 22, the plurality of elastic unit groups 40*a*, 40*b*, 40*c* and the like of the dispersing feed device 20. In FIG. 7, only the main members are illustrated, and the illustration of the other members is omitted. FIG. 8 is a schematic side view for describing the vibration mechanism 30. In FIG. 8, to facilitate the understanding of the configuration, only one elastic unit group 40 and one connection member 50 corresponding to the elastic unit group 40 are illustrated. FIG. 9 is a graph showing one example of the relationship between frequency of vibrations generated by the vibrating sources 32, 33 and amplitude of composite vibration transmitted to the dispersion table 22.

All elastic unit groups 40*a*, 40*b*, 40*c* are also connected to the dispersion table 22 and the counterweight 36 using the same connection structures and hence, the mechanisms for transmitting vibrations of the first elastic unit 41 and/or the second elastic unit 42 to the dispersion table 22 are common among elastic unit groups 40*a*, 40*b*, 40*c*.

The mechanism for transmitting vibrations of the first elastic unit 41 and/or the second elastic unit 42 to the dispersion table 22 is described with reference to FIG. 8 by taking one elastic unit group 40 as an example.

The first elastic unit 41 and the second elastic unit 42 are connected to each other in series. Accordingly, vibrations can be applied to the dispersion table 22 in such a manner that only one of the first elastic unit 41 and the second elastic unit 42 is resonated and the resonated vibrations are applied to the dispersion table 22, or both the first elastic unit 41 and the second elastic unit 42 are resonated, and the composite vibration consisting of the resonated vibrations are applied to the dispersion table 22.

The first elastic unit 41 is inclinedly connected to the dispersion table 22 upward toward one end in the circumferential direction 92. The second elastic unit 42 is inclinedly connected to the dispersion table 22 downward toward the same direction in the circumferential direction 92 by way of the connection member 50 and the first elastic unit 41.

When an AC current is supplied to the first vibrating source 32 from the first current supply circuit 71, vibrations in a vertical direction of the movable core 32c of the first vibrating source 32 are transmitted to the upper end portion of the first elastic unit 41 by way of the table base 26 of the dispersion table 22. When frequency of the vibrations is first natural frequency f1 or frequency near the first natural frequency f1, the first elastic unit 41 resonates. Accordingly, the upper end portion of the first elastic unit 41 swings in an inclination direction 81 perpendicular to a length direction of the first elastic unit 41 around the lower end portion of the first elastic unit 41 as a fulcrum, and the vibrations in the inclination direction 81 are transmitted to the dispersion table 22.

When an AC current is supplied to the second vibrating source 33 from the second current supply circuit 72, vibrations in a vertical direction of the movable core 33c of the second vibrating source 33 are transmitted to the lower end portion of the second elastic unit 42 by way of the connecting base 49 and the connection member 50. When frequency of the vibrations is second natural frequency f2 or frequency near the second natural frequency f2, the second elastic unit 42 resonates. Accordingly, the lower end portion of the second elastic unit 42 swings in an inclination direction 82 perpendicular to a length direction of the second elastic unit 42 around the upper end portion of the second elastic unit 42 as a fulcrum, and the vibrations in the inclination direction 82 are transmitted to the dispersion table 22 by way of the connection member 50 and the first elastic unit 41.

The second elastic unit 42 can resonate in the same manner as described above also due to vibrations of the first vibrating source 32. That is, when vibrations having second natural frequency f2 or frequency near the second natural frequency f2 are generated by the first vibrating source 32, the vibrations are transmitted to the lower end portion of the second elastic unit 42 from the movable core 32c by way of the table base 26, the first elastic unit 41 and the connection member 50, and the second elastic unit 42 resonates in the same manner as described above.

When only the first elastic unit 41 resonates, vibrations in a direction inclined toward the circumferential direction 92 with respect to the vertical direction are applied to the dispersion table 22 at the position in the circumferential direction where the dispersion table 22 is connected to the elastic unit group 40 and hence, articles on the dispersion table 22 bounces obliquely upward. Accordingly, the articles on the dispersion table 22 are fed in a first direction D1 in the circumferential direction 92. On the other hand, when only the second elastic unit 42 resonates, vibrations in a direction inclined toward a side opposite to the circumferential direction 92 with respect to the vertical direction are applied to the dispersion table 22 at the position in the circumferential direction where the dispersion table 22 is connected to the elastic unit group 40 and hence, articles on the dispersion table 22 bounces obliquely upward on a side opposite to the case where only the first elastic unit 41 resonates. Accordingly, the articles on the dispersion table 22 are fed in a second direction D2 opposite to the first direction D1 in the circumferential direction 92.

When both the first elastic unit 41 and the second elastic unit 42 resonate, composite vibration transmitted to the dispersion table 22 can be controlled in various modes by controlling frequency and a phase of vibrations generated by the vibrating sources 32, 33. Accordingly, for example, it is possible to make article on the dispersion table 22 bounce upward, move along a trajectory which draws an ellipse or move back and forth in the circumferential direction 92 without causing the displacement of the articles in the circumferential direction 92.

Figure 9:
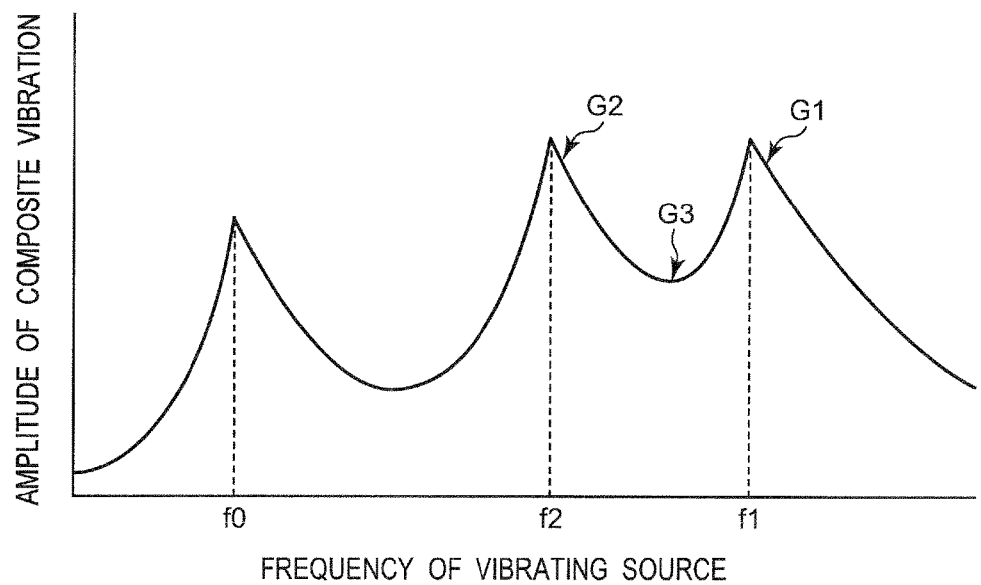
FIG. 9 is a graph showing an example of the relationship between a vibration frequency of a vibrating source and amplitude of a composite vibration.

With reference to FIG. 9, one example of preferred frequency of vibrations generated by the vibrating sources 32, 33 is described. In this case, the first natural frequency f1 and the second natural frequency f2 are set sufficiently larger than the natural frequency f0 of the coil spring of the foot unit 39 and the first natural frequency f1 is larger than the second natural frequency f2.

As shown in FIG. 9, when vibrations having frequency which is equal to either one of the first natural frequency f1 and the second natural frequency f2 are generated, the first elastic unit 41 or the second elastic unit 42 resonates and hence, amplitude of vibrations transmitted to the dispersion table 22 reaches peaks. In a frequency region near these peaks, amplitude of vibrations transmitted to the dispersion table 22 sharply decreases, and there is a tendency that a gradient which indicates the decrease of the amplitude becomes gentle on a high frequency side of the peak compared to a low frequency side of the peak. Therefore, composite vibration of large amplitude can be acquired in the case where frequencies of vibrations generated by the vibrating sources 32, 33 are deviated to a high frequency side of the peak compared to the case where frequency of the vibrations generated by the vibrating sources 32, 33 is deviated to a low vibration side of the peak. Accordingly, when the first elastic unit 41 is resonated singly, to take an error in frequency into consideration, as indicated by reference number G1 in FIG. 9, it is preferable to generate vibrations having frequency slightly larger than the first natural frequency f1 by the first vibrating source 32. In the same manner, when the second elastic unit 42 is resonated singly, as indicated by reference number G2 in FIG. 9, it is preferable to generate vibrations having frequency slightly larger than the second natural frequency f2 by the second vibrating source 33 or the first vibrating source 32.

When both the first elastic unit 41 and the second elastic unit 42 are resonated at common frequency, as indicated by reference number G3 in FIG. 9, vibrations may be generated at frequency between the first natural frequency f1 and the second natural frequency f2. In this case, only the first vibrating source 32 may be driven or both the first vibrating source 32 and the second vibrating source 33 may be driven at the same frequency. In this case, by adjusting frequency of the vibrating source to approach the first natural frequency f1, amplitude of vibrations of the first elastic unit 41 is increased so that it is possible to increase a feed rate of articles toward the first direction D1 (see FIG. 8) in the circumferential direction 92. On the other hand, by adjusting frequency of the vibrating source to approach the second natural frequency f2, amplitude of vibrations of the second elastic unit 42 is increased so that it is possible to increase a feed rate of articles toward the second direction D2 (see FIG. 8) in the circumferential direction 92. To allow both the first elastic unit 41 and the second elastic unit 42 to resonate at the same frequency, the first natural frequency f1 and the second natural frequency f2 may be preliminarily set to values close to each other. On the other hand, to make either one of the first elastic unit 41 and the second elastic unit 42 always resonate singly, the first natural frequency f1 and the second natural frequency f2 may be preliminarily set such that the difference between both frequencies to have a sufficient value (for example, 10 Hz or more).

The first vibrating source 32 and the second vibrating source 33 may be driven at different frequencies. In this case, amplitude of vibrations of the first elastic unit 41 and amplitude of vibrations of the second elastic unit 42 can be individually adjusted. Due to such adjustment, the direction and amplitude of composite vibration transmitted to the dispersion table 22 can be more finely adjusted and hence, articles on the dispersion table 22 can be moved in the various modes described above.

As shown in FIG. 7, the plurality of elastic unit groups 40a, 40b, 40c are arranged at intervals in the circumferential direction 92, and the elastic unit groups 40a, 40b, 40c are connected to the dispersion table 22 at positions different from each other in the circumferential direction 92. By providing the plurality of elastic unit groups 40a, 40b, 40c in a distributed manner in the circumferential direction 92, a load applied to the respective elastic unit groups 40a, 40b, 40c from the dispersion table 22 can be distributed. Accordingly, durability of the respective first elastic units 41a, 41b, 41c and the respective second elastic units 42a, 42b, 42c can be enhanced.

In the respective elastic unit groups 40a, 40b, 40c, the first elastic unit 41a, 41b, 41c and the second elastic unit 42a, 42b, 42c are arranged on a straight line in planar view. In FIG. 7, to facilitate the understanding of the configuration, the entire structure of the second elastic units 42a, 42b, 42c is shown. However, to describe the configuration in a strict manner, one end portions of the second elastic units 42a, 42b, 42c are arranged so as to be hidden below the first elastic units 41 (see FIG. 3 and FIG. 4).

The plurality of elastic unit groups 40a, 40b, 40c are arranged at positions different from each other in planar view and at respective angles different from the radial direction 94. With such a configuration, it is possible to apply vibrations in different directions to the dispersion table 22 at a plurality of places in the circumferential direction 92. Accordingly, it is possible to feed articles on the dispersion table 22 in a twisting direction about the central portion 23a in planar view.

At a predetermined position on the dispersion table 22, the direction of feeding articles due to vibrations applied from the elastic unit group 40a, 40b, 40c corresponding to this position is the first direction D1 or the second direction D2 in the circumferential direction 92 as described above. Further, to the articles on the dispersion table 22, a force which feeds the articles in the direction D3 inclined downwardly toward the outside in the radial direction 94 is applied due to inclination of the inclined surface portion 23b of the table body 23 and gravity. Accordingly, in an actual operation, the articles on the dispersion table 22 are fed to either one of two directions D4, D5 inclined downwardly toward the outside in the radial direction 94 as well as in the circumferential direction 92.

By driving the vibrating sources 32, 33 such that these feeding directions D4, D5 and a feeding amount of the articles can be suitably switched, articles at a predetermined position on the dispersion table 22 can be fed to a desired position on the outer peripheral portion. Accordingly, articles which are dropped and supplied to the central portion 23a and the peripheral portion of the dispersion table 22 from above can be properly supplied to the plurality of sections on the outer peripheral portion of the dispersion table 22 while inhibiting unevenness of dispersion of the articles on the dispersion table 22.

Control System

The control system of the weighing device 1 is described with reference to FIG. 10.

Various operations of the weighing device 1 are controlled by the controller 100. The controller 100 includes: a control unit 102 which controls respective operations of conveying units 6 of the plurality of radial feeders 4, gating units 62 of the plurality of weighing hoppers 10, and a first current supply circuit 71 and a second current supply circuit 72 of the dispersing feed devices 20a, 20b; a calculation unit 104 which performs various calculations necessary for a control executed by the control unit 102; and a storage unit 106 which stores various information necessary for the control executed by the control unit 102.

Respective signals transmitted from the dispersion unevenness detecting unit 64 which detects unevenness of dispersion of articles on the dispersion table 22 and the weight measuring sensors 12 which measure weights of the articles held by the weighing hoppers 10 are inputted to the controller 100. The dispersion unevenness detecting unit 64 may be, for example, a multi-point cell type weight measuring sensor equipped with a plurality of load cells mounted on a lower surface of the dispersion table 22 or an image sensor which images articles on the dispersion table 22 from above. Further, the unevenness of dispersion of articles on the dispersion table 22 may be estimated based on measured weight values of the weight measuring sensors 12 of the plurality of weighing hoppers 10.

The control unit 102 outputs control signals to the conveying unit 6, the gating unit 62, the first current supply circuit 71 and the second current supply circuit 72 based on information calculated by the calculation unit 104, information stored in the storage unit 106 and/or various input signals.

To acquire a combined measured weight value as close as possible to a set weight, it is preferable that articles of a weight which falls within a predetermined range be held in the weighing hopper 10. To allow all weighing hoppers 10 to hold articles of a weight which falls within the predetermined range, the control unit 102 controls a feed amount of articles to the respective weighing hoppers 10 by controlling operations of the first current supply circuit 71 and the second current supply circuit 72 of the dispersing feed devices 20a, 20b, and operations of the conveying units 6 of the radial feeders 4. With such a control, a feed amount of articles from the dispersing feed devices 20a, 20b to the respective radial feeders 4 can be adjusted, and a conveyance amount of articles by the respective radial feeders 4 is adjusted and hence, proper amounts of articles are supplied to the respective weighing hoppers 10. To perform such a control, the calculation unit 104 calculates target values of feed amounts of articles to the weighing hoppers 10 based on weights measured by the weight measuring sensors 12 for the respective weighing hopper 10.

The control of the dispersing feed devices 20a, 20b by the control unit 102 is performed based on target values calculated by the calculation unit 104, and the unevenness of dispersion of articles detected by dispersion unevenness detecting unit 64. In this control, driving of the first vibrating source 32 and/or the second vibrating source 33 is controlled by controlling the first current supply circuit 71 and the second current supply circuit 72 and hence, a mode of vibrations applied to the dispersion table 22 can be controlled.

For example, when excessive amount of articles are present on one end in the circumferential direction 92 on the dispersion table 22, to increase a feeding amount of the articles toward the other end in the circumferential direction 92, amplitude and a phase of vibrations of the first elastic unit 41 or the second elastic unit 42 are adjusted by controlling frequency and/or a phase of the vibrating sources 32, 33. With such a control, it is possible to feed the articles toward the outer peripheral portion of the dispersion table 22 while distributing the articles from one end side to the other end side in the circumferential direction 92 on the dispersion table 22. With such an operation, feed amounts of the articles from the dispersion table 22 to the plurality of radial feeders 4 can be made uniform.

Further, for example, in the case of increasing a feed amount of the articles to the weighing hopper 10 of which articles holding amount is smaller than a predetermined range, frequencies and/or phases of the vibrating sources 32, 33 are controlled so that amplitude and a phase of the vibrations of the first elastic unit 41 or the second elastic unit 42 are adjusted whereby the articles are moved toward a discharge portion to the radial feeder 4 corresponding to the weighing hopper 10 described above from a portion on the dispersion table 22 where the articles are present in a relatively dense manner. On the other hand, in the case of inhibiting the supply of articles to the weighing hopper 10 where an article holding amount is larger than a predetermined range, amplitude and a phase of vibrations of the first elastic unit 41 or the second elastic unit 42 is adjusted such that the articles in the portion where the articles are relatively densely present on the dispersion table 22 reach the outer peripheral portion of the dispersion table 22 at a position displaced from the discharge portion to the radial feeder 4 corresponding to the above-mentioned weighing hopper 10 in the circumferential direction 92. With such an operation, a feed amount of articles from the dispersion table 22 to the radial feeder 4 can be adjusted for every radial feeder 4. By combining a control of conveyance by the radial feeders 4 to a control of feed amounts to the radial feeders 4, the articles holding amount of the individual weighing hoppers 10 can be adjusted. Accordingly, it is possible to perform combination weighing with high accuracy.

Second Embodiment

The second embodiment is described with reference to FIG. 11 to FIG. 14. In the second embodiment, the overall configuration of a weigh measuring device 1 and the configuration of a control system for the weighing device 1 are similar to them of the first embodiment.

In the second embodiment, one dispersing feed device 120 equipped with a dispersion table 122 having a circular shape in planar view is mounted on the weighing device 1 (see FIG. 1 and FIG. 2). The dispersing feed device 120 includes a single dispersion table 122. The dispersion table 122 includes: a table body 123 having an approximately conical upper surface; and a table base 126 which supports the table body 123 by way of connecting units 128.

An upper surface of the table body 123 has: a central portion 123a having an approximately circular shape which is disposed approximately horizontally; and an inclined surface portion 123b which expands obliquely downward toward the outside in a radial direction from the central portion 123a. An outer peripheral portion of the inclined surface portion 123b is formed into a circular shape in planar view, and is disposed at substantially the same height over the entire length. Although the central portion 123a and the inclined surface portion 123b are formed of a flat surface, for example, unevenness may be provided to the inclined surface portion 123b when necessary. For example, a plurality of ribs extending in a radial direction may be formed on the inclined surface portion 123b, and articles on the inclined surface portion 123b may be guided to respective radial feeders 4 (see FIG. 1 and FIG. 2) by these ribs.

The table base 126 is integrally formed with the table body 123 by way of the connecting units 128. When vibrations are applied to the table base 126, the table body 123 is integrally vibrated together with the table base 126. Mounting units 127a, 127b, 127c are mounted on a plurality of places on an outer peripheral portion of the table base 126 in the circumferential direction 192, and one end portions of first elastic units 141 (141a, 141b, 141c) described later are mounted on the mounting units 127a, 127b, 127c. The plurality of these mounting units 127a, 127b, 127c are arranged such that distances from the central portion 123a to the respective mounting units 127a, 127b, 127c are equal to each other and heights of the mounting units 127a, 127b, 127c are equal to each other.

The dispersing feed element 120 includes a vibration mechanism 130 which applies vibrations to the dispersion table 122. The vibration mechanism 130 includes: a plurality of elastic unit groups 140 (140a, 140b, 140c) each having a first elastic unit 141 (141a, 141b, 141c) and a second elastic unit 142 (142a, 142b, 142c); a counterweight 136 connected to the dispersion table 122 by way of the elastic unit groups 140 (140a, 140b, 140c); and vibrating source 132 which vibrates the dispersion table 122 by way of the elastic unit groups 140 (140a, 140b, 140c).

The counterweight 136 is disposed below the table base 126 of the dispersion table 122. Mounting units 138a, 138b, 138c are mounted on a plurality of places on an outer peripheral portion of the counterweight 136 in the circumferential direction 192. One end portions of the second elastic units 142 (142a, 142b, 142c) are mounted on the mounting units 138a, 138b, 138c. The mounting units 138a, 138b, 138c project upward from the counterweight 136. Upper ends of these mounting units 138a, 138b, 138c are disposed at substantially the same height as upper ends of the mounting units 127a, 127b, 127c of the dispersion table 122. Through hole 137 (see FIG. 13) which extends in a vertical direction is formed in the counterweight 136.

The counterweight 136 is mounted on the frame 16 (see FIG. 1) by way of a plurality of foot units 139 projecting downward from the counterweight 136. The foot unit 139 includes a coil spring which is extendable and shrinkable in a vertical direction. Vibrations of the counterweight 136 are damped by the coil springs. With such a configuration, the transmission of vibrations to the frame 16 from the dispersing feed device 120 is inhibited.

Figure 14:
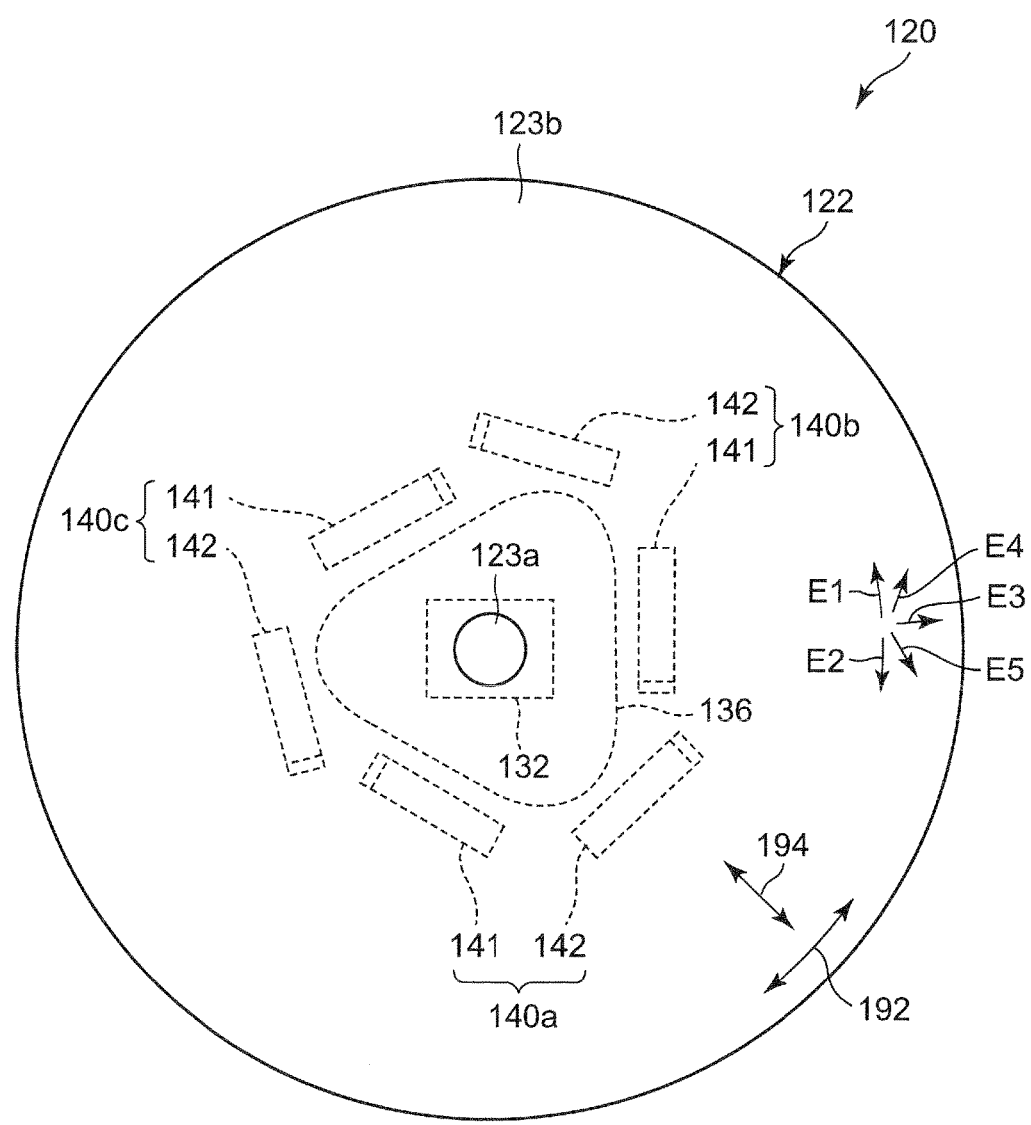
FIG. 14 is a top view showing an arrangement of major elements of the dispersing feed device shown in FIG. 11.

The dispersing feed device 120 includes a connection frame 149 which is arranged so as to surround the counterweight 136 from the outside in a radial direction 194 (see FIG. 14). The connecting frame 149 has an approximately triangular planar shape. A first connecting unit 151 and a second connecting unit 152 are mounted on each vertex portion of the connecting frame 149 in a state where the first connecting unit 151 and the second connecting unit 152 are arranged in a spaced apart manner in a circumferential direction 192. The first connecting unit 151 and the second connecting unit 152 are provided for every elastic unit group 140a, 140b, 140c. The plurality of first connecting units 151 and the plurality of second connecting units 152 are integrally formed with each other by way of the common connecting frame 149.

In the second embodiment, only one vibrating source 132 is provided. However, in the same manner as the first embodiment, a plurality of vibrating sources may be mounted on the dispersing feed device 120. The vibrating source 132 includes: a magnet coil 132*a* and a stationary core 132*b* mounted on the counterweight 136; and a movable core 132*c* mounted on the table base 126 of the dispersion table 122. The magnet coil 132*a* and the stationary core 132*b* are housed in the through hole 137 (see FIG. 13) formed in the counterweight 136.

When an AC current is supplied from the current supply circuit (not shown in the drawing) to the magnet coil 132*a* of the vibrating source 132, a vibration magnetic field is generated so that the movable core 132*c* vibrates in a vertical direction.

The plurality of elastic unit groups 140 (140*a*, 140*b*, 140*c*) are arranged at different positions in the circumferential direction 192 (see FIG. 14). In the second embodiment, three elastic unit groups 140*a*, 140*b*, 140*c* are arranged at angular intervals of 120° in planar view. However, the number of elastic unit groups is not limited to such a number.

The plurality of elastic unit groups 140*a*, 140*b*, 140*c* are disposed parallel to each other between the dispersion table 122 and the counterweight 136. In each elastic unit group 140 (140*a*, 140*b*, 140*c*), the first elastic unit 141 (141*a*, 141*b*, 141*c*) and the second elastic unit 142 (142*a*, 142*b*, 142*c*) are connected in series by way of the first connecting unit 151 and the second connecting unit 152.

The first elastic unit 141 is a member which is similar to the first elastic unit 41 in the first embodiment, and the first elastic unit 141 has first natural frequency f1. The second elastic unit 142 is a member which is similar to the second elastic unit 42 in the first embodiment, and the second elastic unit 142 has second natural frequency f2.

The inclination direction of the first elastic unit 141 with respect to the vertical direction is similar to the inclination direction of the first elastic unit 41 in the first embodiment, and the inclination direction of the second elastic unit 142 with respect to the vertical direction is similar to the inclination direction of the second elastic unit 42 in the first embodiment. That is, also in the second embodiment, the first elastic unit 141 and the second elastic unit 142 are inclinedly arranged in different directions.

An upper end portion of the first elastic unit 141 is fixed to the mounting unit 127*a*, 127*b*, 127*c* of the dispersion table 122. An upper end portion of the second elastic unit 142 is fixed to the mounting unit 138*a*, 138*b*, 138*c* of the counterweight 136. An upper end portion of the first elastic unit 141 and an upper end portion of the second elastic unit 142 are disposed at substantially the same height.

A lower end portion of the first elastic unit 141 extending obliquely downward toward one end in the circumferential direction 192 from a connection with the dispersion table 122 is fixed to the first connecting unit 151. A lower end of the second elastic unit 142 extending obliquely downward toward the other end in the circumferential direction 192 from a connection with the counterweight 136 is fixed to the second connecting unit 152. The lower end portion of the first elastic unit 141 and the lower end portion of the second elastic unit 142 are disposed at substantially the same height.

In this manner, the almost entirety of the first elastic unit 141 and the almost entirety of the second elastic unit 142 are disposed in an overlapping manner in the vertical direction. Accordingly, it is possible to connect the first elastic unit 141 and the second elastic unit 142 having different inclination directions in a compact manner in the vertical direction.

All elastic unit groups 140*a*, 140*b*, 140*c* are connected to the dispersion table 122 and the counterweight 136 using the same connection structures and hence, the mechanisms for transmitting vibrations of the first elastic unit 141 and/or the second elastic unit 142 are common among the elastic unit groups 140*a*, 140*b*, 140*c*.

The first elastic unit 141 and the second elastic unit 142 are connected to each other in series as described above. Accordingly, vibrations can be applied to the dispersion table 122 in such a manner that only one of the first elastic unit 141 and the second elastic unit 142 is resonated and the resonated vibrations are applied to the dispersion table 122, or both the first elastic unit 141 and the second elastic unit 142 are resonated, and combined resonated vibrations are applied to the dispersion table 122.

The first elastic unit 141 is inclinedly connected to the dispersion table 122 upward toward one end in the circumferential direction 192. The second elastic unit 142 is inclinedly connected to the dispersion table 122 downward toward the same direction in the circumferential direction 192 by way of the second connecting unit 152, the first connecting unit 151 and the first elastic unit 141.

When an AC current is supplied to the vibrating source 132, vibrations in a vertical direction of the movable core 132*c* of the vibrating source 132 are transmitted to the upper end portion of the first elastic unit 141 by way of the table base 126 of the dispersion table 122. The vibrations are also transmitted to a lower end portion of the second elastic unit 142 by way of the first elastic unit 141, the first connecting unit 151 and the second connecting unit 152.

When frequency of the vibrations is first natural frequency f1 or frequency near the first natural frequency f1, the first elastic unit 141 resonates. Accordingly, the upper end portion of the first elastic unit 141 swings in an inclination direction 181 perpendicular to a length direction of the first elastic unit 141 around the lower end portion of the first elastic unit 141 as a fulcrum (see FIG. 11), and the vibrations in the inclination direction 181 are transmitted to the dispersion table 122.

On the other hand, when frequency of the vibrations is second natural frequency f2 or frequency near the second natural frequency f2, the second elastic unit 142 resonates. Accordingly, the lower end portion of the second elastic unit 142 swings in an inclination direction 182 perpendicular to a length direction of the second elastic unit 142 around the upper end portion of the second elastic unit 142 as a fulcrum (see FIG. 11), and the vibrations in the inclination direction 182 are transmitted to the dispersion table 122 by way of the first connecting unit 151, the second connecting unit 152 and the first elastic unit 141.

When only the first elastic unit 141 resonates, vibrations in a direction 181 inclined in the circumferential direction 192 with respect to the vertical direction (see FIG. 11) are applied to the dispersion table 122 at the position in the circumferential direction where the dispersion table 122 is connected to the elastic unit group 140 and hence, articles on the dispersion table 122 are fed in a first direction E1 in the circumferential direction 192. On the other hand, when only the second elastic unit 142 resonates, vibrations in a direction 182 inclined toward a side opposite to the circumferential direction 192 with respect to the vertical direction (see FIG. 11) are applied to the dispersion table 122 at the position in the circumferential direction where the dispersion table 122 is connected to the elastic unit group 140 and hence, articles on the dispersion table 122 are fed in a second direction E2 opposite to the first direction E1 in the circumferential direction 192.

When both the first elastic unit 141 and the second elastic unit 142 resonate, composite vibration transmitted to the dispersion table 122 can be controlled in various modes by controlling frequency and a phase of vibrations generated by the vibrating source 132 in the same manner as the first embodiment.

FIG. 14 is a plan view showing the arrangement of the dispersion table 122, the plurality of elastic unit groups 140a, 140b, 140c and the like of the dispersing feed device 120. In FIG. 14, only the main members are illustrated, and the illustration of the other members is omitted.

As shown in FIG. 14, the plurality of elastic unit groups 140a, 140b, 140c are arranged at intervals in the circumferential direction 192, and the elastic unit groups 140a, 140b, 140c are connected to the dispersion table 122 at positions different from each other in the circumferential direction 192. By providing the plurality of elastic unit groups 140a, 140b, 140c in a distributed manner in the circumferential direction 192, a load applied to the respective elastic unit groups 140a, 140b, 140c from the dispersion table 122 can be distributed. Accordingly, durability of the respective first elastic units 141a, 141b, 141c and the respective second elastic units 142a, 142b, 142c can be enhanced.

The plurality of elastic unit groups 140a, 140b, 140c are arranged at positions different from each other in planar view and at respective angles different from the radial direction 194. With such a configuration, it is possible to apply vibrations in different directions to the dispersion table 122 at a plurality of places in the circumferential direction 192. Accordingly, it is possible to feed articles on the dispersion table 122 in a twisting direction about the central portion 123a in planar view.

At a predetermined position on the dispersion table 122, the direction of feeding articles due to vibrations applied from the elastic unit group 140a, 140b, 140c corresponding to this position is the first direction E1 or the second direction E2 in the circumferential direction 192 as described above. Further, to the articles on the dispersion table 122, a force which feeds the articles in the direction E3 inclined downward toward the outside in the radial direction 194 is applied due to inclination of the inclined surface portion 123b of the table body 123 and gravity. Accordingly, in an actual operation, the articles on the dispersion table 122 are fed to either one of two directions E4, E5 inclined downward toward the outside in the radial direction 194 as well as in the circumferential direction 192.

By driving the vibrating source 132 such that these feeding directions E4, E5 and a feeding amount of the articles can be suitably switched, articles at a predetermined position on the dispersion table 122 can be fed to a desired position on the outer peripheral portion. Accordingly, articles which are dropped and supplied to the central portion 123a and the peripheral portion of the dispersion table 122 from above can be properly supplied to the plurality of sections on the outer peripheral portion of the dispersion table 122 while inhibiting unevenness of dispersion of the articles on the dispersion table 122.

The dispersing feed device 120 according to the second embodiment having the above-mentioned configuration is controlled by the control system described in conjunction with the first embodiment. Accordingly, by controlling driving of the vibrating source 132 in the same manner as the first embodiment, a mode of vibrations applied to the dispersion table 122 can be controlled. Accordingly, the unevenness of dispersion of the articles on the dispersion table 122 can be inhibited and, at the same time, proper amounts of articles can be supplied to the respective weighing hoppers 10 and hence, accuracy of combination weighing can be increased.

Although the present invention has been described by exemplifying the above-mentioned embodiments heretofore, the present invention is not limited to the above-mentioned embodiments.

For example, in the above-mentioned embodiments, the description has been made with respect to the cases where a dispersion table having a circular shape in a plan view and the dispersion table having a semicircular shape in a plan view are used. In the present invention, however, a planar shape of the dispersion table is not particularly limited as long as the planar shape continues in a circumferential direction about a vertical direction. For example, the dispersion table may have a shape formed by dividing a circle in three or more in a circumferential direction or a polygonal shape.

In the above-mentioned embodiments, the description has been made with respect to the example where each elastic unit group is formed of two elastic units. However, an elastic unit group may be formed of three or more elastic units which differ from each other in an inclination direction with respect to a vertical direction and natural frequency.

In the above-mentioned embodiments, the description has been made with respect to the dispersing feed device equipped with one or two vibrating sources. However, the dispersing feed device may have three or more vibrating sources. Further, the vibrating source is not limited to a vibrating source which includes a magnet coil and a movable core and, for example, a vibrating source formed of a piezoelectric element may be used.

PARTS LIST

1: combination weighing device
2: dispersing feed element
3: delivery element
4: radial feeder
5: trough
6: conveying unit
8: pool hopper
10: weighing hopper
12: weight measuring sensor
14: merging chute
16: frame
20: dispersing feed device
22: dispersion table
23: table body
23a: central portion
23b: inclined surface portion
24: bulkhead
26: table base
28: connecting unit
30: vibration mechanism
32: first vibrating source
32a: magnet coil
32b: stationary core
32c: movable core
33: second vibrating source
33a: magnet coil
33b: stationary core
33c: movable core
36: counterweight
39: foot unit 40a, 40b, 40c: elastic unit group
41a, 41b, 41c: first elastic unit
42a, 42b, 42c: second elastic unit
49: connecting base
50a, 50b, 50c: connecting member
51: horizontal portion
52: rising portion
62: gating unit
64: dispersion unevenness detecting unit
71: first current supply circuit (drive unit)
72: second current supply circuit (drive unit)
100: controller
102: control unit
104: calculation unit
106: storage unit
120: dispersing feed device
122: dispersion table
123: table body
123a: central portion
123b: inclined surface portion
126: table base
128: connecting unit
130: vibration mechanism
132: vibrating source
132a: magnet coil
132b: stationary core
132c: movable core
136: counterweight
139: foot unit
140a, 140b, 140c: elastic unit group
141a, 141b, 141c: first elastic unit
142a, 142b, 142c: second elastic unit
149: connecting base
150a, 150b, 150c: connecting member group
151: first connecting unit
152: second connecting unit

The invention claimed is:

1. A dispersing feed device comprising:
a dispersion table adapted to receive articles supplied from above and to feed the articles to multiple sections on a periphery of the dispersion table;
a first elastic unit inclinedly connected to the dispersion table, the first elastic unit having a first natural frequency;
a second elastic unit connected to the dispersion table inclinedly in a direction different from the inclination direction of the first elastic unit, the second elastic unit having a second natural frequency which is different from the first natural frequency;
at least one vibrating source adapted to vibrate the dispersion table through the first and second elastic units; and
a control unit adapted to change the frequency of the vibration generated by the at least one vibrating source to vary a feed direction of the articles on the dispersion table.

2. The dispersing feed device in claim 1, comprising multiple elastic unit groups each of which includes the first and second elastic units, the multiple elastic unit groups being connected to the dispersion table at positions different from each other in a circumferential direction.

3. The dispersing feed device in claim 2, wherein the dispersion table has a circular or arc-like periphery in planar view, and
wherein the multiple elastic unit groups are arranged at different angles in planar view.

4. The dispersing feed device in claim 3, comprising a plurality of the vibrating sources and drive units adapted to drive the vibrating sources at different vibration frequencies.

5. The dispersing feed device in claim 1, wherein the first elastic unit is arranged in a direction which is inclined with respect to a vertical direction, and
wherein the second elastic unit is arranged in a direction which is inclined with respect to the vertical direction and differs from the inclination direction of the first elastic unit.

6. The dispersing feed device in claim 5, comprising a counterweight connected to the dispersion table through the first and second elastic units,
wherein the first and second elastic units are connected in series with each other between the dispersion table and the counterweight,
wherein an upper end portion of the first elastic unit is connected to the dispersion table,
wherein an upper end portion of the second elastic unit is connected to the counterweight, and
wherein lower end portions of the first and second elastic units are connected to each other.

7. The dispersing feed device in claim 6, comprising a connecting member connecting the first and second elastic units to each other, the connecting member having a horizontal portion arranged horizontally and a rising portion extending upward from the horizontal portion,
wherein the first elastic unit extends obliquely downward from a connection with the dispersion table toward one side of the circumferential direction and is connected on its lower end portion to the rising portion, and
wherein the second elastic unit extends obliquely downward from a connection with the counterweight toward the other side of the circumferential direction and is connected on its lower end portion to the horizontal portion.

8. The dispersing feed device in claim 1, comprising a dispersion unevenness detecting unit adapted to detect unevenness of dispersion of the articles on the dispersion table, and a control unit adapted to control a vibration frequency of a vibration generated by the at least one vibrating source based on dispersion unevenness detected by the dispersion unevenness detecting unit.

9. A combination weighing device comprising:
the dispersing feed device according to claim 1;
multiple weighing hoppers arrayed in the circumferential direction around the dispersion table, the weighing hoppers each adapted to hold the articles supplied from the dispersion table;
weight measuring units adapted to measure a weight of the articles held by each of the weighing hoppers;
a calculation unit adapted to calculate a target value of feed amount of the articles to each of the weighing hoppers based on the weights measured by the weight measuring units; and
a control unit adapted to control a vibration frequency of a vibration generated by the at least one vibrating source based on the target value calculated by the calculation unit.

10. The combination weighing device in claim 9, comprising a dispersion unevenness detecting unit adapted to detect unevenness of dispersion of the articles on the dispersion table,
wherein the control unit is adapted to control the vibration frequency of the vibration generated by the at least one vibrating source based on the target value calculated by the calculation unit and the unevenness of dispersion of the articles detected by the dispersion unevenness detecting unit.

\* \* \* \* \*